United States Patent
Sakaguchi et al.

(10) Patent No.: US 10,818,177 B2
(45) Date of Patent: Oct. 27, 2020

(54) DRIVING ASSISTANCE DEVICE AND DRIVING ASSISTANCE METHOD

(71) Applicant: Mitsubishi Electric Corporation, Tokyo (JP)

(72) Inventors: Sunao Sakaguchi, Tokyo (JP); Yuji Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/619,019

(22) PCT Filed: Jul. 12, 2017

(86) PCT No.: PCT/JP2017/025424
§ 371 (c)(1),
(2) Date: Dec. 3, 2019

(87) PCT Pub. No.: WO2019/012629
PCT Pub. Date: Jan. 17, 2019

(65) Prior Publication Data
US 2020/0090514 A1   Mar. 19, 2020

(51) Int. Cl.
G08G 1/00 (2006.01)
G08G 1/0968 (2006.01)
G08G 1/0965 (2006.01)
G08G 1/16 (2006.01)
H04W 4/024 (2018.01)
(Continued)

(52) U.S. Cl.
CPC ..... G08G 1/096855 (2013.01); G08G 1/0965 (2013.01); G08G 1/162 (2013.01); G01S 13/867 (2013.01); G01S 13/931 (2013.01); H04W 4/024 (2018.02)

(58) Field of Classification Search
None
See application file for complete search history.

(56) References Cited

U.S. PATENT DOCUMENTS 9,802,614 B1 * 10/2017 Yoon .................... G05D 1/0088
2012/0025969 A1    2/2012 Dozza
2017/0169709 A1    6/2017 Ando
(Continued)

FOREIGN PATENT DOCUMENTS

JP   2004-61356 A    2/2004
JP   2006-64661 A    3/2006
(Continued)

OTHER PUBLICATIONS

Japanese Office Action for Japanese Application No. 2019-529377, dated Apr. 7, 2020, with machine English translation.
(Continued)

*Primary Examiner* — Julie B Lieu
(74) *Attorney, Agent, or Firm* — Birch, Stewart, Kolasch & Birch, LLP

(57) ABSTRACT

A control unit (3) determines whether a host vehicle has deviated from the lane of a scheduled travel route using information acquired by an information acquiring unit (2). A notification unit (4) notifies a driver of the host vehicle of the lane deviation of the host vehicle. A wireless communication unit (5) transmits lane deviation information indicating the lane deviation of the host vehicle to another vehicle.

7 Claims, 17 Drawing Sheets

(51) Int. Cl.
  *G01S 13/86* (2006.01)
  *G01S 13/931* (2020.01)

(56) References Cited

U.S. PATENT DOCUMENTS

| | | | |
|---|---|---|---|
| 2017/0287335 A1* | 10/2017 | Ansari | B60W 40/04 |
| 2017/0337813 A1* | 11/2017 | Taylor | G05D 1/0287 |
| 2017/0345310 A1* | 11/2017 | Yoon | B60W 30/0956 |
| 2017/0371349 A1* | 12/2017 | Kim | G08G 1/164 |
| 2018/0053060 A1* | 2/2018 | Huang | G01S 5/16 |
| 2018/0090004 A1 | 3/2018 | Kuraoka | |
| 2019/0080611 A1* | 3/2019 | Yamada | G06K 9/00791 |
| 2019/0098471 A1* | 3/2019 | Rech | G08G 1/162 |
| 2019/0276033 A1* | 9/2019 | Fung | G06K 9/00906 |

FOREIGN PATENT DOCUMENTS

| | | |
|---|---|---|
| JP | 2007-192619 A | 8/2007 |
| JP | 2012-523057 A | 9/2012 |
| JP | 2014-134831 A | 7/2014 |
| JP | 2015-87893 A | 5/2015 |
| JP | 2016-206798 A | 12/2016 |
| JP | 2017-111576 A | 6/2017 |

OTHER PUBLICATIONS

International Search Report for PCT/JP2017/025424 (PCT/ISA/210) dated Oct. 3, 2017.

* cited by examiner

DRIVING ASSISTANCE DEVICE AND DRIVING ASSISTANCE METHOD

TECHNICAL FIELD

The present invention relates to a driving assistance device and a driving assistance method for assisting driving.

BACKGROUND ART

In recent years, there have been proposed various detection devices for detecting a lane using a camera, a millimeter wave radar, or the like mounted on a host vehicle in order to keep the traveling lane of the vehicle and to detect lane deviation. A navigation device according to Patent Literature 1 compares lane information obtained from a detection device as described above with a guidance route of the host vehicle, and performs notification when the host vehicle is about to deviate from the guidance route. The navigation device according to Patent Literature 1 further re-searches a guidance route when the host vehicle is about to deviate from the guidance route.

CITATION LIST

Patent Literature

Patent Literature 1: JP 2004-61356 A

SUMMARY OF INVENTION

Technical Problem

The navigation device according to Patent Literature 1 notifies that the host vehicle is about to deviate from the guidance route or teaches a guidance route that has been re-searched. There is no problem when the driver follows the re-searched guidance route; however, there is a possibility that the driver hastens to go back to the guidance route when informed of probable deviation from the guidance route, which may hinder the traveling of surrounding vehicles and may result in a collision between the host vehicle and a surrounding vehicle.

As described above, there is a problem in which it is possible that the driver of the host vehicle abruptly changes lanes in an attempt to return to the guidance route in a case of probable deviation from the guidance route, which may result in a collision between the host vehicle and a surrounding vehicle.

The present invention has been made in order to solve the above-mentioned problem, and it is an object of the present invention to increase the probability of avoiding hazards such as collision.

Solution to Problem

A driving assistance device according to the present invention includes: a communication device to acquire route information indicating a scheduled travel route of a host vehicle and surrounding information indicating a surrounding situation of the host vehicle detected by a sensor mounted on the host vehicle; a processor to execute a program; a memory to store the program which, when executed by the processor, performs a process of determining whether the host vehicle has deviated from a lane of the scheduled travel route using the route information and the surrounding information of the host vehicle acquired by the communication device; and at least one of a display to notify a driver of the host vehicle in a case where lane deviation of the host vehicle is determined and a speaker to notify the driver of the host vehicle when lane deviation of the host vehicle is determined, in which the communication device transmits, to a different vehicle, the route information of the host vehicle, traveling lane information indicating a lane on which the host vehicle is traveling, and lane deviation information indicating lane deviation of the host vehicle.

Advantageous Effects of Invention

According to the present invention, when lane deviation of a host vehicle is determined, a driver of the host vehicle is notified and lane deviation information indicating lane deviation of the host vehicle is transmitted to a different vehicle. Therefore, it is possible to notify the different vehicle around the host vehicle that the driver of the host vehicle, who has been notified of the lane deviation, may change lanes in an attempt to return to the scheduled travel route and to thereby increase the possibility of avoiding hazards such as collision.

DESCRIPTION OF EMBODIMENTS

To describe the present invention further in detail, embodiments for carrying out the present invention will be described below with reference to the accompanying drawings.

First Embodiment

Figure 1:
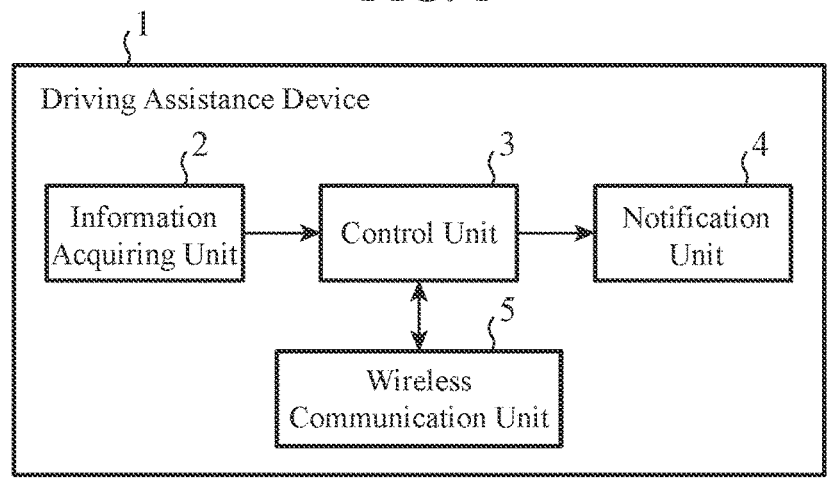
FIG. 1 is a block diagram illustrating an exemplary configuration of a driving assistance device according to a first embodiment.

FIG. 1 is a block diagram illustrating an exemplary configuration of a driving assistance device 1 according to a first embodiment. The driving assistance device 1 is mounted on a vehicle.

Hereinafter, that the driving assistance device 1 of FIG. 1 is mounted on each of multiple vehicles, and description is given focusing on one of the vehicles. In the following description, the noted one vehicle is referred to as the "host vehicle," and another vehicle is referred to as a "different vehicle."

The driving assistance device 1 includes an information acquiring unit 2, a control unit 3, a notification unit 4, and a wireless communication unit 5. The driving assistance device 1 mounted on the host vehicle and the driving assistance device 1 mounted on the different vehicle have the same configuration and operate in the same manner.

The information acquiring unit 2 acquires route information indicating a route on which the host vehicle is scheduled to travel (hereinafter referred to as a scheduled travel route) and surrounding information indicating the surrounding situation of the host vehicle, and outputs these pieces of information to the control unit 3.

Here, the route information is, for example, information on a route taught by a navigation device mounted on or brought into the host vehicle, and includes information such as traveling straight and right/left turn. The information acquiring unit 2 acquires the route information of the host vehicle from the navigation device.

The surrounding information relates to, for example, at least one of the current location of the host vehicle, lanes, and a detection object present around the host vehicle. The information acquiring unit 2 acquires the surrounding information of the host vehicle from a camera or a sensor such as a millimeter wave radar mounted on the host vehicle.

The control unit 3 identifies a lane on which the host vehicle is traveling using the route information and the surrounding information of the host vehicle acquired by the information acquiring unit 2. How to identify a lane will be described later. Then, the control unit 3 compares the lane of the scheduled travel route of the host vehicle with the lane on which the host vehicle is traveling, and thereby determines whether the lane on which the host vehicle is traveling is incorrect. In a case where the control unit 3 determines that the lane of the scheduled travel route of the host vehicle and the lane on which the host vehicle is traveling are different and thus the lane on which the host vehicle is traveling is incorrect, the control unit 3 outputs lane deviation information indicating that the host vehicle has deviated from the lane of the scheduled travel route to the notification unit 4. The control unit 3 further outputs the lane deviation information and the route information of the host vehicle and traveling lane information indicating the lane on which the host vehicle is traveling to the wireless communication unit 5.

The control unit 3 also outputs lane deviation information of the different vehicle received by the wireless communication unit 5 to the notification unit 4.

When having received the lane deviation information of the host vehicle from the control unit 3, the notification unit 4 notifies the driver of the host vehicle that the host vehicle has deviated from the lane of the scheduled travel route and thereby draws attention.

In addition, when having received the lane deviation information of the different vehicle from the control unit 3, the notification unit 4 notifies the driver of the host vehicle that the different vehicle has deviated from the lane of a scheduled travel route thereof and thereby draws attention.

The notification unit 4 issues notification by at least one of display and voice output.

When having received the lane deviation information, the route information, and the traveling lane information of the host vehicle from the control unit 3, the wireless communication unit 5 transmits these pieces of information to the driving assistance device 1 of the different vehicle.

The wireless communication unit 5 also receives the lane deviation information, route information, and traveling lane information of the different vehicle from the driving assistance device 1 mounted on the different vehicle and outputs these pieces of information to the control unit 3. Details of the wireless communication unit 5 will be described later.

Next, exemplary operation of the driving assistance device 1 according to the first embodiment will be described.

Figure 2:
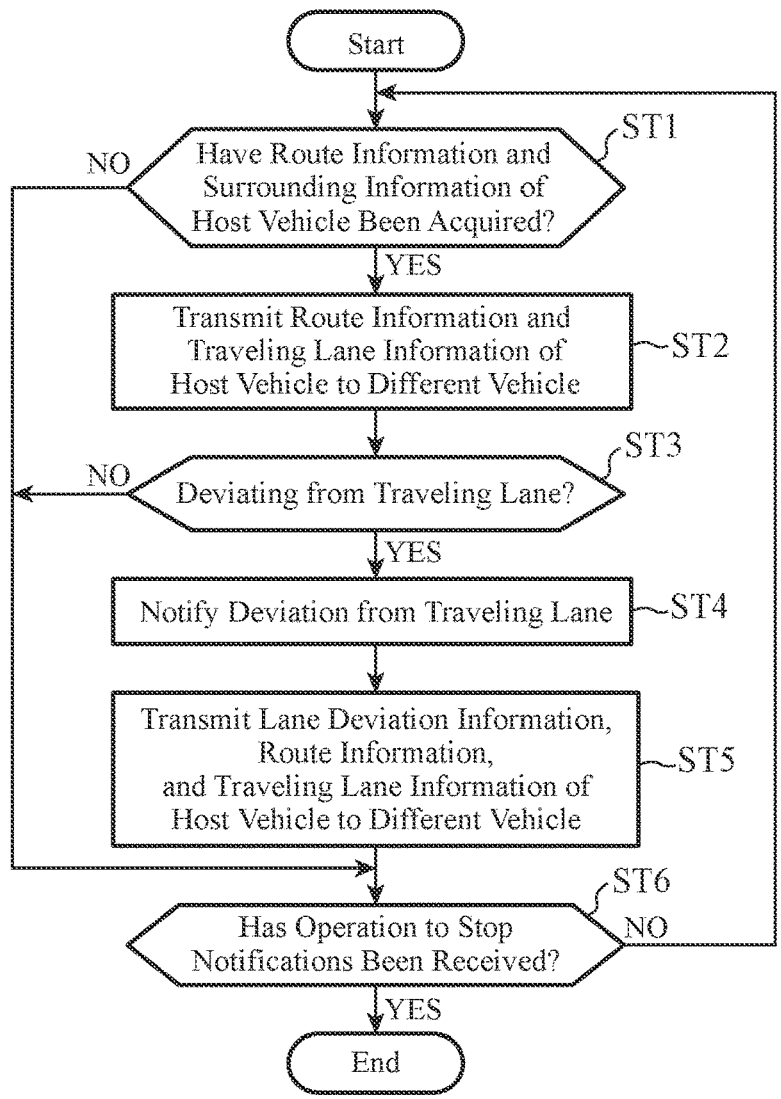
FIG. 2 is a flowchart illustrating exemplary operation of the driving assistance device according to the first embodiment, and is an example in which determination of lane deviation of a host vehicle is included.

FIG. 2 is a flowchart illustrating exemplary operation of the driving assistance device 1 according to the first embodiment, and is an example in which determination of lane deviation of the host vehicle is included. The driving assistance device 1 repeats the operation illustrated in the flowchart of FIG. 2.

In step ST1, the information acquiring unit 2 acquires route information of the host vehicle from a navigation device or the like and surrounding information of the host vehicle from a sensor or the like, and outputs these pieces of information to the control unit 3. If the information acquiring unit 2 has acquired the route information and the surrounding information of the host vehicle (step ST1 "YES"), the control unit 3 performs step ST2; otherwise (step ST1 "NO"), the control unit 3 performs step ST6.

In step ST2, the control unit 3 identifies the lane on which the host vehicle is traveling using the route information and the surrounding information of the host vehicle, and thereby generates traveling lane information. Then, the control unit 3 instructs the wireless communication unit 5 to transmit the route information and the traveling lane information of the host vehicle to a different vehicle around the host vehicle.

In step ST3, the control unit 3 compares the lane on which the host vehicle is actually traveling with the lane of a scheduled travel route on the basis of the route information and the traveling lane information of the host vehicle. If the lane on which the host vehicle is actually traveling and the lane of the scheduled travel route are different (step ST3 "YES"), the control unit 3 determines that the host vehicle has deviated from the lane of the scheduled travel route, and performs step ST4. On the other hand, if the lane on which the host vehicle is actually traveling and the lane of the scheduled travel route match with each other (step ST3 "NO"), the control unit 3 determines that the host vehicle has not deviated from the lane of the scheduled travel route, and performs step ST6.

In step ST4, the control unit 3 instructs the notification unit 4 to notify the driver of the host vehicle of the fact that the host vehicle has deviated from the lane of the scheduled travel route.

In step ST5, the control unit 3 instructs the wireless communication unit 5 to transmit the lane deviation information, the route information, and the traveling lane information of the host vehicle to the different vehicle around the host vehicle.

In step ST6, the control unit 3 determines whether an input device (not illustrated) has received operation to stop notifications. If it is determined that operation to stop notifications has been received (step ST6 "YES"), the control unit 3 stops notification by the notification unit 4 and ends the operation illustrated in the flowchart of FIG. 2. On the other hand, if it is determined that no operation to stop notifications has been received (step ST6 "NO"), the control unit 3 causes step ST1 to be performed again. Note that the input device (not illustrated) is, for example, an input unit 8 in FIG. 9, which will be described later.

Figure 3:
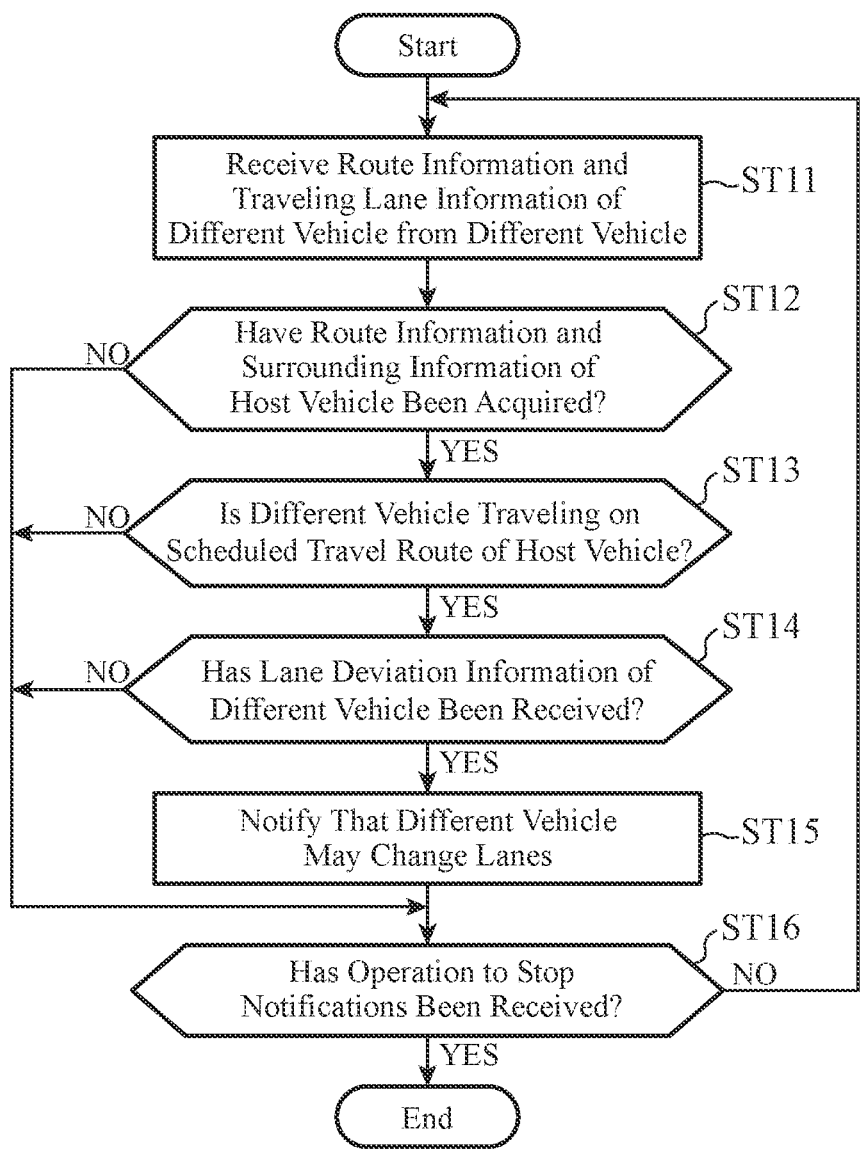
FIG. 3 is a flowchart illustrating exemplary operation of the driving assistance device according to the first embodiment, and is an example in which use of lane deviation information of a different vehicle is included.

FIG. 3 is a flowchart illustrating exemplary operation of the driving assistance device 1 according to the first embodiment, and is an example in which use of lane deviation information of a different vehicle is included. The driving assistance device 1 repeats the operation illustrated in the flowchart of FIG. 3.

In the flowchart of FIG. 3, a host vehicle and a different vehicle are defined as follows for convenience of explanation. The different vehicle in the flowchart of FIG. 3 corresponds to the vehicle that transmits the lane deviation information in the flowchart of FIG. 2. The host vehicle in the flowchart of FIG. 3 corresponds to the vehicle that receives the lane deviation information transmitted and uses the information in the flowchart of FIG. 2. Note that the host vehicle and the different vehicle are each mounted with the driving assistance device 1.

In step ST11, the wireless communication unit 5 receives the route information and the traveling lane information of the different vehicle around the host vehicle and outputs these pieces of information to the control unit 3. Here, the route information of the different vehicle refers to a scheduled travel route of the different vehicle, and the traveling lane information of the different vehicle refers to the lane on which the different vehicle is actually traveling.

In step ST12, the information acquiring unit 2 acquires route information of the host vehicle from a navigation device or the like and surrounding information of the host vehicle from a sensor or the like, and outputs these pieces of information to the control unit 3. If the information acquiring unit 2 has acquired the route information and the surrounding information of the host vehicle (step ST12 "YES"), the control unit 3 performs step ST13; otherwise (step ST12 "NO"), the control unit 3 performs step ST16.

In step ST13, the control unit 3 detects the location of the different vehicle on the basis of the route information and the traveling lane information of the different vehicle received in step ST11. Then, the control unit 3 determines whether the detected location of the different vehicle is on a scheduled travel route of the host vehicle on the basis of the route information of the host vehicle acquired in step ST12. If it is determined that the location of the different vehicle is on the scheduled travel route of the host vehicle (step ST13 "YES"), the control unit 3 determines that there is a possibility that the different vehicle hinders the travel of the host vehicle by changing lanes, and performs step ST14. On the other hand, if it is determined that the location of the different vehicle is not on the scheduled travel route of the host vehicle (step ST13 "NO"), the control unit 3 determines that the different vehicle does not hinder the travel of the host vehicle, and performs step ST16.

In step ST14, the control unit 3 determines whether the wireless communication unit 5 has received lane deviation information from the different vehicle whose location has been determined to be on the scheduled travel route of the host vehicle in step ST13. If it is determined that the lane deviation information has been received from the different vehicle (step ST14 "YES"), the control unit 3 performs step ST15, and if it is determined that no lane deviation information has been received (step ST14 "NO"), the control unit 3 performs step ST16.

In step ST15, the control unit 3 causes the notification unit 4 to notify the driver of the host vehicle that the different vehicle is traveling on a wrong lane and thus there is a possibility of a sudden lane change in an attempt to return to the correct lane.

In step ST16, the control unit 3 determines whether an input device (not illustrated) has received operation to stop notifications. If it is determined that operation to stop notifications has been received (step ST16 "YES"), the control unit 3 stops notification by the notification unit 4 and ends the operation illustrated in the flowchart of FIG. 3. On the other hand, if it is determined that no operation to stop notifications has been received (step ST16 "NO"), the control unit 3 causes step ST11 to be performed again.

Next, a specific example of operation of the driving assistance device 1 according to the first embodiment will be described.

Figure 4:
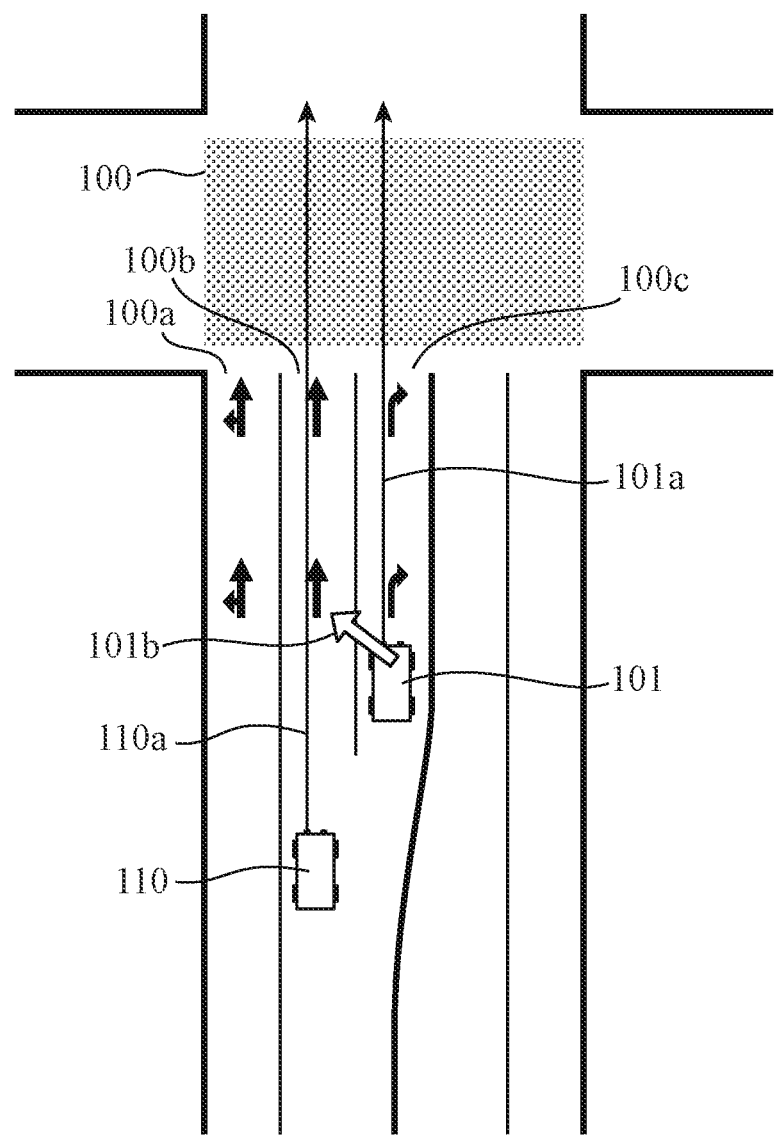
FIG. 4 is a diagram illustrating a situation in which a first vehicle scheduled to travel straight has erroneously entered a right turn lane in the first embodiment.

FIG. 4 is a diagram illustrating a situation in which a first vehicle 101 scheduled to travel straight has erroneously entered a right turn lane 100c in the first embodiment. In FIG. 4, a left turn and straight lane 100a, a straight lane 100b, and the right turn lane 100c are connected to an intersection 100. A scheduled travel route 101a of the first vehicle 101 traveling on the right turn lane 100c and a scheduled travel route 110a of a second vehicle 110 traveling on the straight lane 100b are indicated by arrows.

In this example, because the scheduled travel route 101a of the first vehicle 101 is a straight line, the first vehicle 101 needs to travel on the left turn and straight lane 100a or the straight lane 100b, on which travelling straight is allowed; however, the first vehicle 101 is travelling on the right turn lane 100c deviating from the scheduled travel route 101a.

The operation illustrated in the flowchart of FIG. 2 in the situation illustrated in FIG. 4 will be described below. Note that the first vehicle 101 and the second vehicle 110 are each mounted with the driving assistance device 1.

In step ST1, the information acquiring unit 2 of the driving assistance device 1 mounted on the first vehicle 101 acquires route information and surrounding information of the first vehicle 101. The route information of the first vehicle 101 indicates the scheduled travel route 101a. The surrounding information of the first vehicle 101 indicates the right turn lane 100c, that is, indicates a right turn at the intersection 100.

In step ST2, the wireless communication unit 5 of the driving assistance device 1 mounted on the first vehicle 101 transmits the route information and traveling lane information of the first vehicle 101 to the driving assistance device 1 mounted on the second vehicle 110.

In step ST3, the control unit 3 of the driving assistance device 1 mounted on the first vehicle 101 compares the lane of the scheduled travel route 101a with the right turn lane 100c, and thereby determines whether the first vehicle 101 has deviated from the lane of the scheduled travel route 101a. As illustrated in FIG. 4, though the scheduled travel route 101a is a straight travel route through the intersection 100, the lane on which the first vehicle 101 is actually traveling is the right turn lane 100c. In this case, the control unit 3 determines that the first vehicle 101 has deviated from the lane of the scheduled travel route 101a (step ST3 "YES"), and causes step ST4 to be performed. On the other hand, if the first vehicle 101 is traveling on the left turn and straight lane 100a or the straight lane 100b, the control unit 3 determines that the first vehicle 101 has not deviated from the lane of the scheduled travel route 101a (step ST3 "NO"), and causes step ST6 to be performed.

In step ST4, the notification unit 4 of the driving assistance device 1 mounted on the first vehicle 101 notifies the driver of the first vehicle 101 that the first vehicle 101 has deviated from the lane of the scheduled travel route 101a.

In step ST5, the wireless communication unit 5 of the driving assistance device 1 mounted on the first vehicle 101 transmits the lane deviation information, the route information, and the traveling lane information of the first vehicle 101 to the driving assistance device 1 mounted on the second vehicle 110.

If the driver of the first vehicle 101 performs operation to stop notifications in step ST6 (step ST6 "YES"), the notification unit 4 of the driving assistance device 1 mounted on the first vehicle 101 stops notifications. On the other hand, if the driver of the first vehicle 101 performs no operation to stop notifications (step ST6 "NO"), the control unit 3 causes step ST1 to be performed again.

The operation illustrated in the flowchart of FIG. 3 in the situation illustrated in FIG. 4 will be described below. In this example, explanation is given assuming that the second vehicle 110 corresponds to the vehicle that receives the lane deviation information transmitted from the first vehicle 101 and uses the information.

In step ST11, the wireless communication unit 5 of the driving assistance device 1 mounted on the second vehicle 110 receives the route information and the traveling lane information of the first vehicle 101 transmitted from the driving assistance device 1 mounted on the first vehicle 101.

In step ST12, the information acquiring unit 2 of the driving assistance device 1 mounted on the second vehicle 110 acquires route information and traveling lane information of the second vehicle 110. The route information of the second vehicle 110 indicates the scheduled travel route 110a, that is, indicates traveling straight through the intersection 100. The traveling lane information of the second vehicle 110 indicates the straight lane 100b.

In step ST13, the control unit 3 determines whether the location of the first vehicle 101 is on the scheduled travel route 110a of the second vehicle 110. If both the first vehicle 101 and the second vehicle 110 travel straight through the intersection 100 as illustrated in FIG. 4, the control unit 3 of the driving assistance device 1 mounted on the second vehicle 110 determines that the location of the first vehicle 101 is on the scheduled travel route 110a of the second vehicle 110 (step ST13 "YES"), and performs step ST14.

In step ST14, the control unit 3 of the driving assistance device 1 mounted on the second vehicle 110 determines whether the wireless communication unit 5 has received lane deviation information from the first vehicle 101. The control unit 3 of the second vehicle 110 determines that lane deviation information of the first vehicle 101 has been received (step ST14 "YES"), and causes step ST15 to be performed.

In step ST15, the notification unit 4 of the driving assistance device 1 mounted on the second vehicle 110 notifies the driver of the second vehicle 110 that there is a possibility that the first vehicle 101 suddenly changes lanes in a correct traveling lane direction 101b since the first vehicle 101 has deviated from the scheduled travel route 101a. The notification unit 4 of the second vehicle 110 displays an image as illustrated in FIG. 4, for example.

If the driver of the second vehicle 110 performs operation to stop notifications in step ST16 (step ST16 "YES"), the notification unit 4 of the driving assistance device 1 mounted on the second vehicle 110 stops notifications. On the other hand, if the driver of the second vehicle 110 performs no operation to stop notifications (step ST16 "NO"), the control unit 3 causes step ST11 to be performed again.

As described above, the driver of the first vehicle 101 may suddenly change lanes to modify the traveling lane thereof when the traveling lane and the lane of the scheduled travel route 101a are different. Moreover, when notified that the traveling lane is different from the lane of the scheduled travel route 101a, the driver of the first vehicle 101 may change lanes even more suddenly. If, in this situation, the driving assistance device 1 of the first vehicle 101 determines that the lane of the scheduled travel route 101a of the first vehicle 101 is different from the lane on which the first vehicle 101 is currently traveling, the driving assistance device 1 of the first vehicle 101 notifies the driving assistance device 1 of the second vehicle 110 that the first vehicle 101 may change lanes. This enables the driving assistance device 1 of the second vehicle 110 to determine and notify that the first vehicle 101 may interfere with the travel of the second vehicle 110 before the first vehicle 101 changes lanes, thereby enabling avoidance of hazards such as collision.

Furthermore, with the driving assistance device 1 of the first vehicle 101 continuing to transmit the route information and the traveling lane information of the first vehicle 101 to the driving assistance device 1 of the second vehicle 110, the second vehicle 110, which receives these pieces of information, can determine whether information is provided from the first vehicle 101 on the scheduled travel route 110a of the second vehicle 110. This enables the driving assistance device 1 of the second vehicle 110 to extract lane deviation information from only a vehicle that may interfere with the travel of the second vehicle 110.

FIG. 4 illustrates, as an example, the situation in which the lane deviation of the first vehicle 101 is determined by the driving assistance device 1 since the first vehicle 101, whose scheduled travel route 101a is straight ahead, has erroneously entered the right turn lane 100c. The driving assistance device 1 can determine lane deviation of the first vehicle 101 also in situations illustrated in FIGS. 5 to 8. In addition to the situations illustrated in FIGS. 4 to 8, the invention according to the first embodiment is applied in situations in which lane deviation of the first vehicle 101 can be determined.

Figure 5:
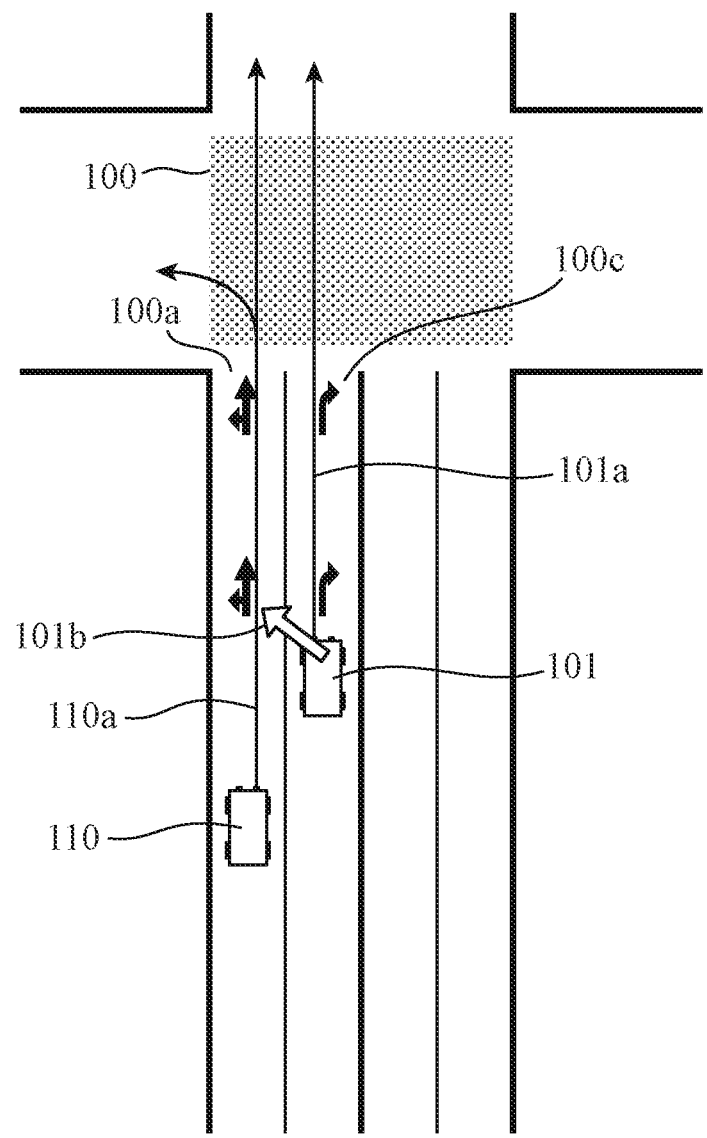
FIG. 5 is a diagram illustrating a situation in which the first vehicle scheduled to travel straight has erroneously entered a right turn lane of two lanes in each direction in the first embodiment.

FIG. 5 is a diagram illustrating a situation in which the first vehicle 101 scheduled to travel straight has erroneously entered a right turn lane 100*c* of two lanes in each direction in the first embodiment. The second vehicle 110 is scheduled to travel straight or to turn left, and thus its traveling is hindered when the first vehicle 101 changes lanes in a correct traveling lane direction 101*b*. In this situation, the driving assistance device 1 mounted on the second vehicle 110 can notify the driver that the first vehicle 101 may change lanes.

Figure 6:
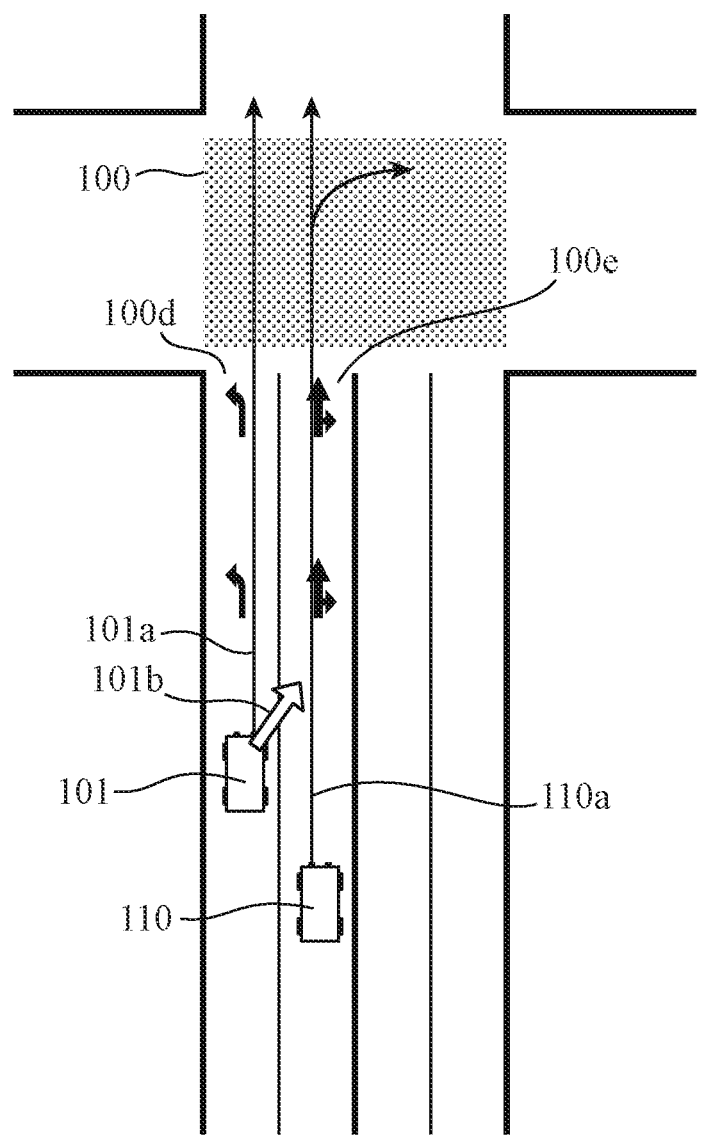
FIG. 6 is a diagram illustrating a situation in which the first vehicle scheduled to travel straight has erroneously entered a left turn lane in the first embodiment.

FIG. 6 is a diagram illustrating a situation in which the first vehicle 101 scheduled to travel straight has erroneously entered a left turn lane 100*d* in the first embodiment. The second vehicle 110 is scheduled to travel straight or to turn right, and thus its traveling is hindered when the first vehicle 101 changes lanes in a correct traveling lane direction 101*b*. In this situation, the driving assistance device 1 mounted on the second vehicle 110 can notify the driver that the first vehicle 101 may change lanes.

Figure 7:
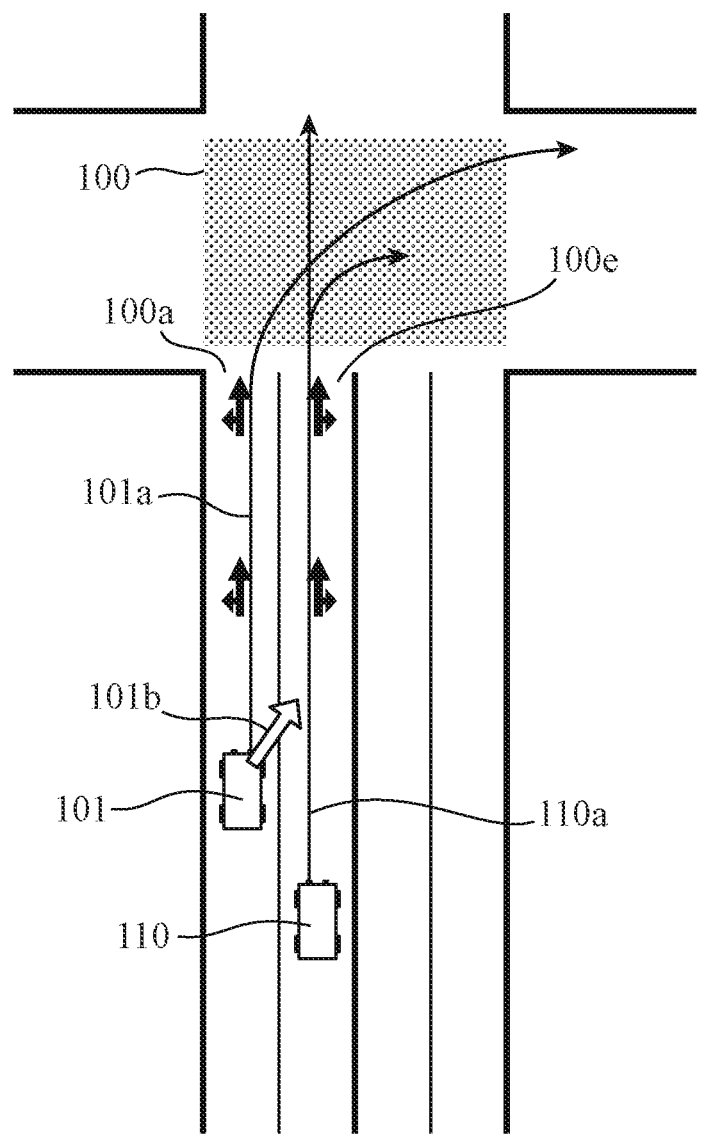
FIG. 7 is a diagram illustrating a situation in which the first vehicle scheduled to turn right has erroneously entered a left turn and straight lane in the first embodiment.

FIG. 7 is a diagram illustrating a situation in which the first vehicle 101 scheduled to turn right has erroneously entered a left turn and straight lane 100*a* in the first embodiment. The second vehicle 110 is scheduled to travel straight or to turn right, and thus its traveling is hindered when the first vehicle 101 changes lanes in a correct traveling lane direction 101*b*. In this situation, the driving assistance device 1 mounted on the second vehicle 110 can notify the driver that the first vehicle 101 may change lanes.

Figure 8:
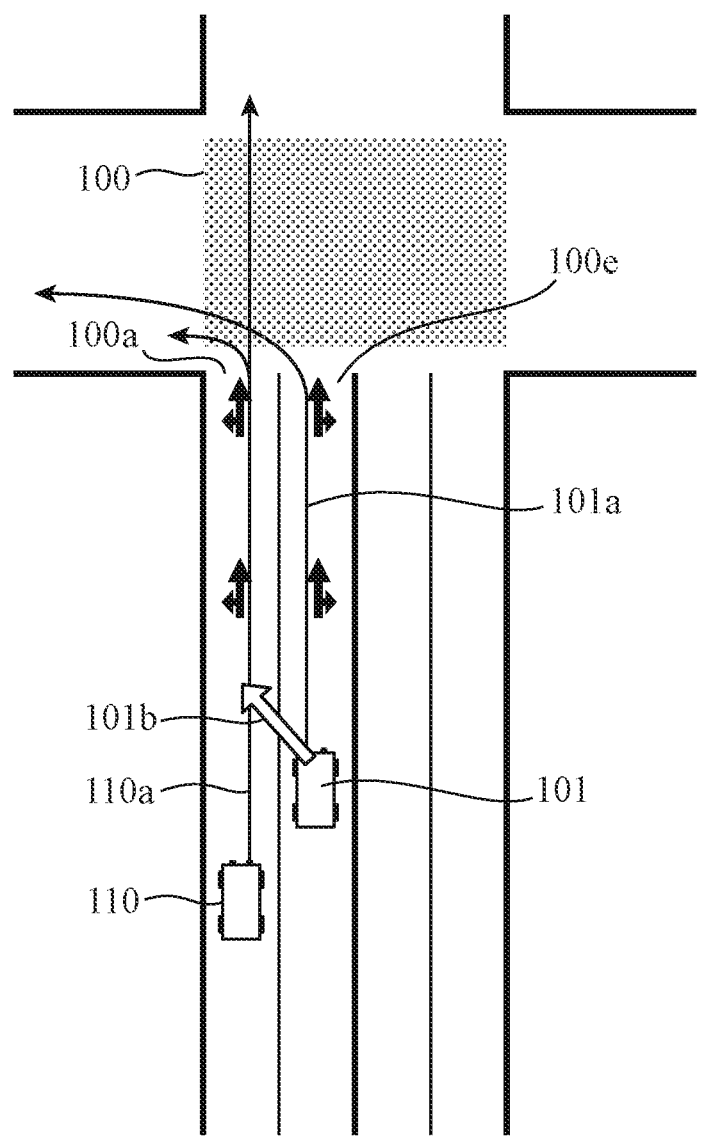
FIG. 8 is a diagram illustrating a situation in which the first vehicle scheduled to turn left has erroneously entered a right turn and straight lane in the first embodiment.

FIG. 8 is a diagram illustrating a situation in which the first vehicle 101 scheduled to turn left has erroneously entered a right turn and straight lane 100*e* in the first embodiment. The second vehicle 110 is scheduled to travel straight or to turn right, and thus its traveling is hindered when the first vehicle 101 changes lanes in a correct traveling lane direction 101*b*. In this situation, the driving assistance device 1 mounted on the second vehicle 110 can notify the driver that the first vehicle 101 may change lanes.

The driving assistance device 1 according to the first embodiment may be a single device or may be incorporated in an onboard device. Further, a part of the functions of the driving assistance device 1 may be configured in an onboard device, and another part of the functions may be configured in a server device outside the vehicle or in an information terminal such as a smartphone brought into the vehicle. For example, the information acquiring unit 2, the notification unit 4, and the wireless communication unit 5 illustrated in FIG. 1 are configured as an onboard device while the control unit 3 is configured as a server device, and the functions of the onboard device and the function of the server device exchange information by wireless communication, thereby determining lane deviation of the vehicle.

Hereinafter, an exemplary configuration in which the driving assistance device 1 is incorporated in a navigation device which is one type of onboard devices will be described.

Figure 9:
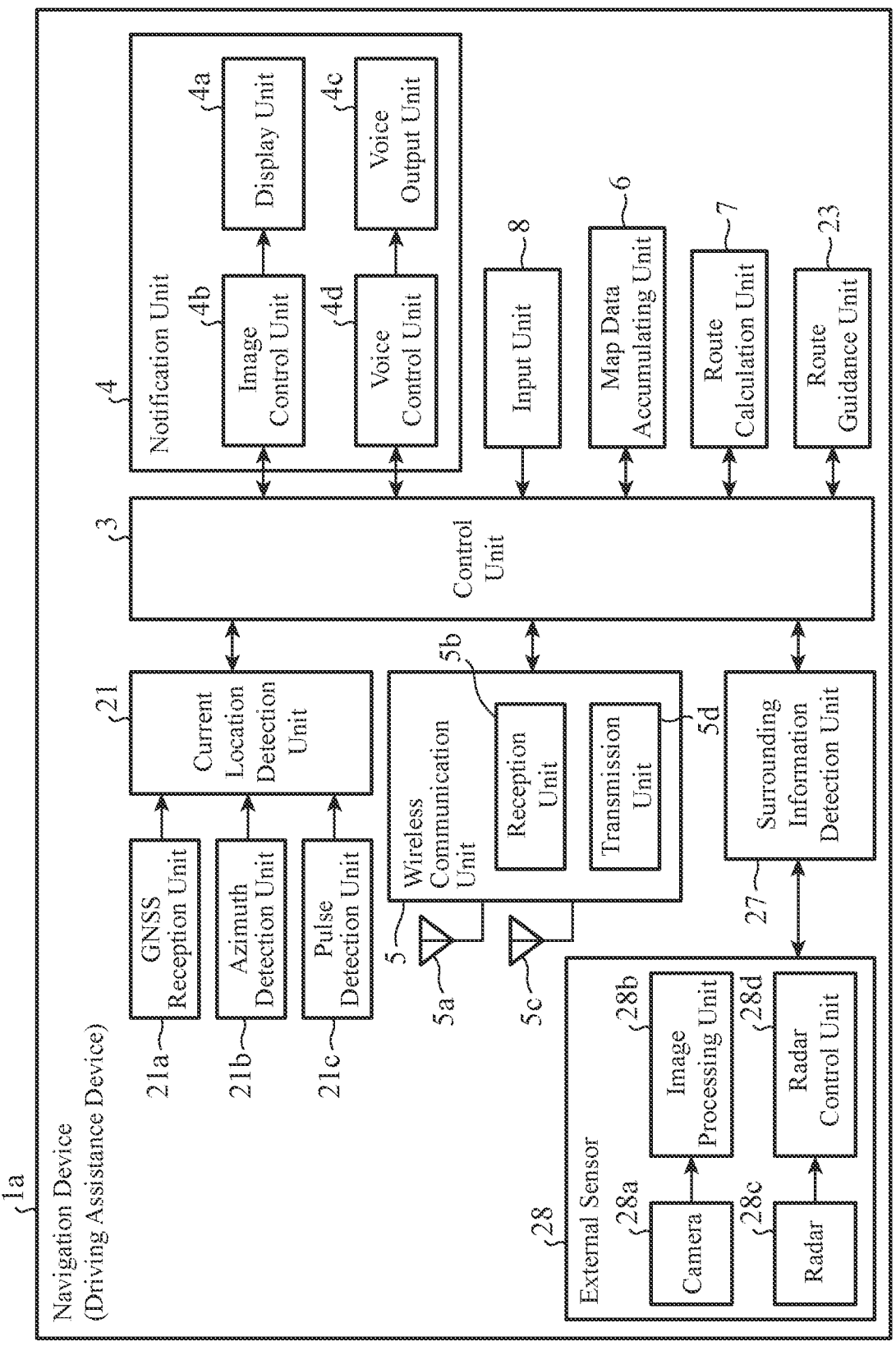
FIG. 9 is a block diagram illustrating an exemplary configuration in which the driving assistance device according to the first embodiment is adopted in a navigation device.

FIG. 9 is a block diagram illustrating an exemplary configuration in which the driving assistance device 1 according to the first embodiment is adopted in a navigation device 1*a*. The navigation device 1*a* includes a map data accumulating unit 6, a route calculation unit 7, and an input unit 8 in addition to the information acquiring unit 2, the control unit 3, the notification unit 4, and the wireless communication unit 5.

The driving assistance device 1 of FIG. 1 includes the information acquiring unit 2 for acquiring route information and surrounding information from information sources. Meanwhile, the navigation device 1*a* of FIG. 9 includes a current location detection unit 21, a global navigation satellite system (GNSS) reception unit 21*a*, an azimuth detection unit 21*b*, a pulse detection unit 21*c*, a route guidance unit 23, a surrounding information detection unit 27, and an external sensor 28 as information sources. The information acquiring unit 2 of the first embodiment may acquire information from information sources or may be the information sources themselves. Note that details of the current location detection unit 21, the GNSS reception unit 21*a*, the azimuth detection unit 21*b*, the pulse detection unit 21*c*, the route guidance unit 23, the surrounding information detection unit 27, and the external sensor 28 will be described later.

The notification unit 4 includes a display unit 4*a*, an image control unit 4*b*, a voice output unit 4*c*, and a voice control unit 4*d*.

The display unit 4*a* includes a display. The image control unit 4*b* causes the display unit 4*a* to display images such as a map image, a guidance image, and a lane deviation notification image on the basis of image data output from the control unit 3 and including the map image, the guidance image, and the lane deviation notification image. The voice output unit 4*c* includes a speaker. The voice control unit 4*d* causes the voice output unit 4*c* to output voices such as a guidance voice and a lane deviation notification sound on the basis of voice data output from the control unit 3 and including the guidance voice and the lane deviation notification sound.

The wireless communication unit 5 includes a reception antenna 5*a*, a reception unit 5*b*, a transmission antenna 5*c*, and a transmission unit 5*d*.

The reception unit 5*b* receives various types of information transmitted from a different vehicle via the reception antenna 5*a* and outputs the received information to the control unit 3. The transmission unit 5*d* receives various types of information to be transmitted to a different vehicle from the control unit 3 and transmits the information to the different vehicle via the transmission antenna 5*c*. In the first embodiment, the wireless communication unit 5 is configured to perform inter-vehicle communication for directly exchanging various types of information with a different vehicle located within an area where communication is available, that is, with a different vehicle around the host vehicle. In the case where the wireless communication unit 5 is configured to perform inter-vehicle communication, it is not necessary to provide a new communication infrastructure. However, the way of communication used by the wireless communication unit 5 is not limited to inter-vehicle communication, and may be a mobile communication network or road-to-vehicle communication.

The map data accumulating unit 6 includes a storage device such as a hard disk drive (HDD) or a random access memory (RAM), for example, and accumulates map data. The control unit 3 can access the map data accumulated in the map data accumulating unit 6. Note that the map data accumulating unit 6 may acquire map data from outside the navigation device 1*a*. For example, the map data accumulating unit 6 may download map data from an external device via a network or may read map data from a recording medium such as a digital versatile disc (DVD)-read only memory (ROM) or a Blu-Ray (registered trade mark) Disc-ROM.

On the basis of a start point, such as the current location of the host vehicle detected by the current location detection unit 21 described later, a destination received by the input unit 8 from a user, and the map data accumulated in the map data accumulating unit 6, the route calculation unit 7 calculates routes from the start point to the destination on a map. The calculated routes may be, for example, a route with a short arrival time (time priority route), a route with a short travel distance (distance priority route), a route with low fuel consumption (fuel priority route), a route that prioritizes toll roads (toll-road priority route), a route that prioritizes general roads (general-road priority route), and a route that balances time, distance, and cost (standard route). The user referred to in the above is not limited to the driver of the host vehicle, but may be a passenger or the like.

The input unit 8 includes, for example, a push button device, a voice recognition device, or a touch panel. The input unit 8 receives operation by the user such as input operation of destination information that specifies a destination the host vehicle is to arrive at and the above-mentioned operation to stop notifications, and outputs the operation to the control unit 3. Note that in the case where the input unit 8 includes a touch panel, the input unit 8 may be integrated with the display unit 4a. For example, when the user performs operation of selecting a point on a map displayed on the display unit 4a in a scrollable manner, the input unit 8 receives the point as destination information, and when the user performs operation of inputting an address or a telephone number, the input unit 8 receives the address or the telephone number as destination information.

The current location detection unit 21 is connected with the GNSS reception unit 21a, the azimuth detection unit 21b, and the pulse detection unit 21c.

The GNSS reception unit 21a receives signals with time information transmitted from artificial satellites such as global positioning system (GPS) satellites and detects the current location of the host vehicle by performing calculation used in the satellite positioning system. The current location of the host vehicle is given as, for example, coordinates of latitude and longitude. The azimuth detection unit 21b includes, for example, a gyro sensor and an azimuth sensor, and detects a traveling direction of the host vehicle. The traveling direction of the host vehicle is given as, for example, an azimuth. The pulse detection unit 21c detects a pulse signal corresponding to the number of revolutions per unit time of the axle of the host vehicle, and detects the traveling velocity and the travel distance of the host vehicle on the basis of the pulse signal.

The current location detection unit 21 is capable of detecting the accurate current location of the host vehicle by correcting the current location received by the GNSS reception unit 21a on the basis of the traveling direction, the traveling velocity, and the travel distance detected by the azimuth detection unit 21b and the pulse detection unit 21c. The current location detection unit 21 outputs the detected current location to the control unit 3.

The route guidance unit 23 stores a route selected by the user via the input unit 8 or other components from among the routes calculated by the route calculation unit 7. The route selected by the user is the scheduled travel route of the host vehicle, and corresponds to the route information acquired by the information acquiring unit 2 in the driving assistance device 1 of FIG. 1. The route guidance unit 23 generates guidance image data, guidance voice data, and the like on the basis of the current location of the host vehicle in the scheduled travel route, and outputs the data to the notification unit 4 via the control unit 3. The route guidance unit 23 guides the driver of the host vehicle from the current location to the destination along the scheduled travel route by at least one of a guidance image and a guidance voice.

The external sensor 28 includes a camera 28a, an image processing unit 28b, a radar 28c, and a radar control unit 28d.

The camera 28a is, for example, capable of imaging in the visible light range or the infrared range. The camera 28a is installed, for example, at a position near the rearview mirror on the interior side of the windshield of the host vehicle, and images, through the windshield, an outside area which is a predetermined detection area ahead in the traveling direction of the host vehicle. Note that a charge coupled device (CCD) camera or a complementary metal oxide semiconductor (CMOS) camera, for example, is used as the camera 28a. The image processing unit 28b performs predetermined image processing such as filtering and binarization processing on the image captured by the camera 28a, thereby generates image data including two-dimensionally arrayed pixels, and outputs the image data to the surrounding information detection unit 27.

The radar 28c uses, for example, laser light or millimeter waves. The radar 28c is installed, for example, in the nose portion of the body of the host vehicle or near the windshield in the compartment, and emits an emission signal such as laser light or a millimeter wave in a detection direction such as ahead in the traveling direction of the host vehicle under the control of the radar control unit 28d. The radar 28c further receives a reflection signal generated by the emission signal reflected by an object outside the host vehicle, generates a beat signal by mixing the reflection signal and the emission signal, and outputs the beat signal to the surrounding information detection unit 27. The radar control unit 28d controls the radar 28c in accordance with a control command input from the surrounding information detection unit 27 to the radar control unit 28d.

The surroundings of the host vehicle, the surroundings being the detection target area of the surrounding information detection unit 27, include, for example, a round area centered at the host vehicle and having a radius of the maximum detection range of the external sensor 28, or a fan-shaped partial area of the round area. Detection objects of the surrounding information detection unit 27 include a moving object such as a different vehicle around the host vehicle and a still object such as a white line on a road surface indicating a traveling lane, a road sign indicating a right/left turn or straight lane, or a construction sign.

The surrounding information detection unit 27 determines whether the image data from the image processing unit 28b includes an image of a detection object by, for example, determining whether the image data includes an image of a predetermined moving object or still object. When it is determined that the image data includes an image of a detection object, the surrounding information detection unit 27 calculates a first distance between a reference position in the image included in the image data and the detection object using, for example, the center position of the image in the horizontal direction as the reference position, and also calculates a second distance between the detection object and the host vehicle on the basis of the beat signal generated by the radar 28c. The surrounding information detection unit 27 calculates the relative position of the detection object relative to the position of the host vehicle in the horizontal direction on the basis of the first distance and the second distance. Then, the surrounding information detection unit 27 calculates the current location of the detection object on the basis of the calculated relative position and the current location of the host vehicle detected by the current location detection unit 21. The current location of the detection object is given as, for example, coordinates of latitude and longitude.

When it is determined that the detection object is a moving object, the surrounding information detection unit 27 calculates velocity information such as a velocity vector of the detection object by calculating a temporal change in the current location of the detection object.

The control unit 3 identifies the lane on which the host vehicle is currently traveling using the information received from the surrounding information detection unit 27. For example, the control unit 3 identifies the lane on which the host vehicle is currently traveling by identifying a sign on a road surface, the road shape, or a road sign detected by the external sensor 28.

In addition to the information received from the surrounding information detection unit 27, or in place of the information received from the surrounding information detection unit 27, the control unit 3 may use the current location of the host vehicle received from the current location detection unit 21, the map data of the map data accumulating unit 6, or the like to identify the lane on which the host vehicle is currently traveling. For example, the control unit 3 identifies the lane on which the host vehicle is currently traveling by using the high-precision location of the host vehicle detected by the current location detection unit 21 and lane information included in the map data of the map data accumulating unit 6.

The control unit 3 compares the identified lane with the lane of the scheduled travel route based on the route information to determine lane deviation of the host vehicle.

As described above, the driving assistance device 1 according to the first embodiment includes the information acquiring unit 2, the control unit 3, the notification unit 4, and the wireless communication unit 5. The information acquiring unit 2 acquires route information indicating a scheduled travel route of the host vehicle and surrounding information indicating the surrounding situation of the host vehicle detected by the sensor mounted on the host vehicle. The control unit 3 determines whether the host vehicle has deviated from the lane of the scheduled travel route by using the route information and the surrounding information of the host vehicle acquired by the information acquiring unit 2. The notification unit 4 notifies the driver of the host vehicle when the control unit 3 determines lane deviation of the host vehicle. The wireless communication unit 5 transmits, to a different vehicle, the route information of the host vehicle, traveling lane information indicating the lane on which the host vehicle is traveling, and lane deviation information indicating lane deviation of the host vehicle. Therefore, it is possible to notify the vehicle around the host vehicle that the driver of the host vehicle, who has been notified of the lane deviation, may change lanes in an attempt to return to the scheduled travel route and to thereby increase the possibility of avoiding hazards such as collision. Furthermore, with the host vehicle continuing to transmit route information and traveling lane information of the host vehicle, a different vehicle receiving these pieces of information can determine whether the information is from the host vehicle present on the scheduled travel route of the different vehicle, thereby enabling the different vehicle to extract the lane deviation information from only a vehicle that may interfere with the travel of the different vehicle.

In addition, the wireless communication unit 5 of the first embodiment receives lane deviation information indicating that a different vehicle has deviated from the lane of a scheduled travel route, the lane deviation information transmitted from the different vehicle. The notification unit 4 notifies the driver of the host vehicle of lane deviation of the different vehicle when the wireless communication unit 5 receives the lane deviation information of the different vehicle. Therefore, it is possible to notify the driver of the host vehicle that the driver of the different vehicle, who has been notified of the lane deviation, may change lanes in an attempt to return to the scheduled travel route and to thereby increase the possibility of avoiding hazards such as collision. Furthermore, the accuracy of hazard prediction is expected to be improved by using lane deviation information transmitted from a vehicle around the host vehicle, compared to the case where the possibility of changing lanes of the vehicle around the host vehicle is predicted by using only surrounding information detected by the sensor or the like mounted on the host vehicle.

Second Embodiment

The configuration of a driving assistance device 1 according to a second embodiment is the same as that illustrated in FIG. 1 or 9 of the first embodiment in the drawings, and thus FIGS. 1 and 9 are referred to hereinbelow. In the second embodiment, the driving assistance device 1 mounted on a host vehicle notifies a driver of the host vehicle that a different vehicle may change lanes when lane deviation information is received from the different vehicle or when the driving assistance device 1 mounted on the host vehicle determines lane deviation of the different vehicle.

Figure 10:
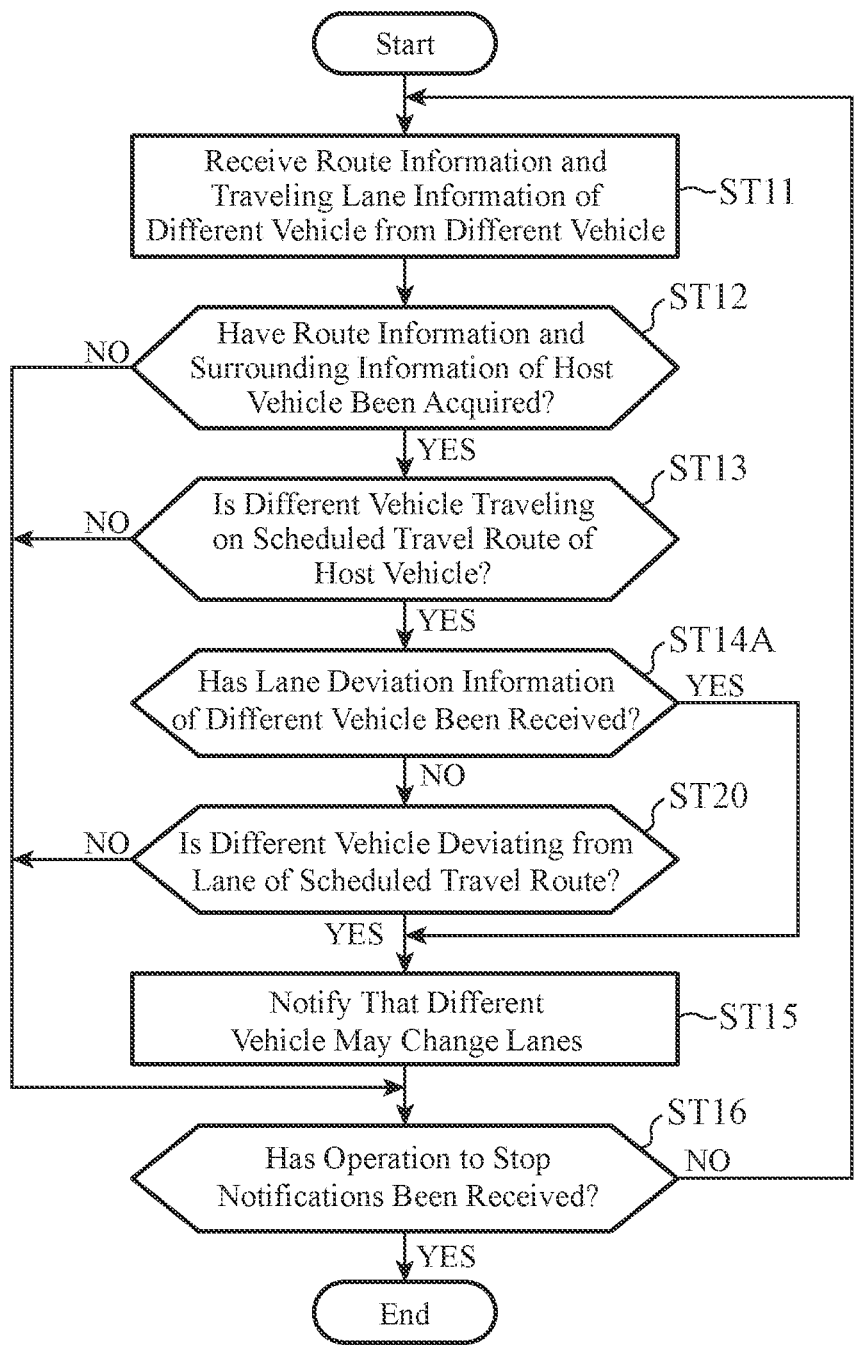
FIG. 10 is a flowchart illustrating exemplary operation of a driving assistance device according to a second embodiment, and is an example in which use of lane deviation information of a different vehicle is included.

FIG. 10 is a flowchart illustrating exemplary operation of the driving assistance device 1 according to the second embodiment. In the flowchart illustrated in FIG. 10, step ST20 is newly added between steps ST14 and ST15 of the flowchart illustrated in FIG. 3. Therefore, the operation will be described below focusing on step ST20.

In step ST14A, the control unit 3 of the driving assistance device 1 mounted on the host vehicle determines whether the wireless communication unit 5 has received lane deviation information from a different vehicle whose location is determined to be on a scheduled travel route of the host vehicle in step ST13. If it is determined that the lane deviation information has been received from the different vehicle (step ST14A "YES"), the control unit 3 performs step ST15, and if it is determined that no lane deviation information has been received (step ST14A "NO"), the control unit 3 performs step ST20.

In step ST20, the control unit 3 of the driving assistance device 1 mounted on the host vehicle identifies the lane on which the different vehicle is traveling on the basis of route information of the different vehicle and surrounding information of the host vehicle. If it is determined that the different vehicle has deviated from the lane of the scheduled travel route of the different vehicle (step ST20 "YES"), the control unit 3 performs step ST15, and if it is determined that the different vehicle has not deviated (step ST20 "NO"), the control unit 3 performs step ST16.

Note that the method of identifying a traveling lane of the different vehicle by the control unit 3 of the driving assistance device 1 mounted on the host vehicle is not limited. For example, the control unit 3 identifies the lane on which the different vehicle is currently traveling by using the high-precision location of the host vehicle detected by the current location detection unit 21 of the host vehicle, the current location of the different vehicle detected by the external sensor 28 of the host vehicle, and the like. Alternatively, for example, the image processing unit 28b identifies the lane on which the different vehicle is traveling by using images of the different vehicle and the traveling lane of the different vehicle captured by the camera 28a of the host vehicle. Then, the control unit 3 compares the lane on which the different vehicle is traveling with the lane of the scheduled travel route based on the route information of the different vehicle received from the different vehicle.

Next, exemplary operation in step ST20 in the situation illustrated in FIG. 4 will be described.

In step ST20, the control unit 3 of the driving assistance device 1 mounted on the second vehicle 110 determines that the first vehicle 101 is traveling on the right turn lane 100c deviating from the scheduled travel route 101a (step ST20 "YES"), and performs step ST15. On the other hand, if the first vehicle 101 is traveling on the left turn and straight lane 100a or the straight lane 100b, the control unit 3 of the driving assistance device 1 mounted on the second vehicle 110 determines that the first vehicle 101 has not deviated from the lane of the scheduled travel route 101a (step ST20 "NO"), and performs step ST16.

As described above, the wireless communication unit 5 of the second embodiment receives route information indicating a scheduled travel route of a different vehicle transmitted from the different vehicle. The control unit 3 determines whether the different vehicle has deviated from the lane of the scheduled travel route using the route information of the different vehicle received by the wireless communication unit 5 and surrounding information of the host vehicle acquired by the information acquiring unit 2. The notification unit 4 notifies the driver of the host vehicle when the control unit 3 determines lane deviation of the different vehicle. As a result, in a case where the different vehicle cannot transmit lane deviation information or before the lane deviation information is transmitted from the different vehicle, the lane deviation of the different vehicle can be determined more promptly. Thus, the possibility of avoiding hazards such as collision can be further increased.

Third Embodiment

The configuration of a driving assistance device 1 according to a third embodiment is the same as that illustrated in FIG. 1 or 9 of the first embodiment in the drawings, and thus FIGS. 1 and 9 are referred to hereinbelow. In the third embodiment, the driving assistance device 1 mounted on a host vehicle notifies a driver of the host vehicle that a different vehicle may change lanes when lane deviation information is received from the different vehicle and when the driving assistance device 1 mounted on the host vehicle determines lane deviation of the different vehicle.

Figure 11:
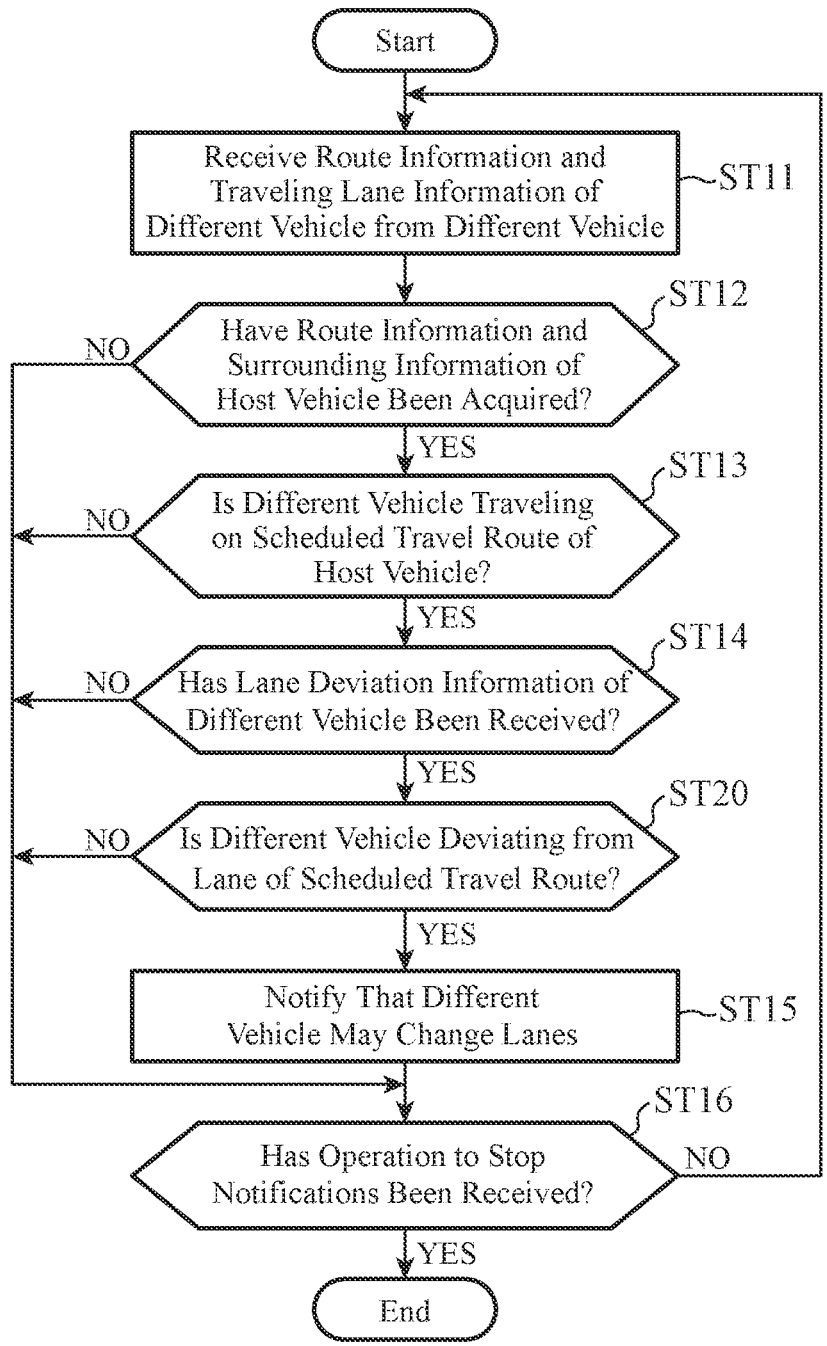
FIG. 11 is a flowchart illustrating exemplary operation of a driving assistance device according to a third embodiment, and is an example in which use of lane deviation information of a different vehicle is included.

FIG. 11 is a flowchart illustrating exemplary operation of the driving assistance device 1 according to the third embodiment. The flowchart illustrated in FIG. 11 is a partially-modified version of the flowchart illustrated in FIG. 10 of the second embodiment.

If the control unit 3 of the driving assistance device 1 mounted on the host vehicle determines that the wireless communication unit 5 has received lane deviation information from a different vehicle whose location is determined to be on a scheduled travel route of the host vehicle in step ST13 (step ST14 "YES") and determines that the different vehicle has deviated from the lane of a scheduled travel route of the different vehicle (step ST20 "YES"), the control unit 3 performs step ST15.

As described above, the wireless communication unit 5 of the third embodiment receives route information indicating the scheduled travel route of the different vehicle and the lane deviation information indicating that the different vehicle has deviated from the lane of the scheduled travel route, the route information and the lane deviation information transmitted from the different vehicle. The control unit 3 determines whether the different vehicle has deviated from the lane of the scheduled travel route using the route information of the different vehicle received by the wireless communication unit 5 and surrounding information of the host vehicle acquired by the information acquiring unit 2. The notification unit 4 notifies the driver of the host vehicle when the wireless communication unit 5 receives the lane deviation information of the different vehicle and when the control unit 3 determines lane deviation of the different vehicle. As a result, the driver of the host vehicle is notified only when both the different vehicle and the host vehicle have determined the lane deviation of the different vehicle, and thus the frequency of erroneous notifications to the driver of the host vehicle can be reduced.

Fourth Embodiment

The configuration of a driving assistance device 1 according to a fourth embodiment is the same as that illustrated in FIG. 1 or 9 of the first embodiment in the drawings, and thus FIGS. 1 and 9 are referred to hereinbelow. In the fourth embodiment, the driving assistance device 1 mounted on a host vehicle stops transmission of lane deviation information when a driver of the host vehicle continues traveling on the current lane without following a scheduled travel route after transmitting the lane deviation information to the driving assistance device 1 mounted on a different vehicle.

Figure 12:
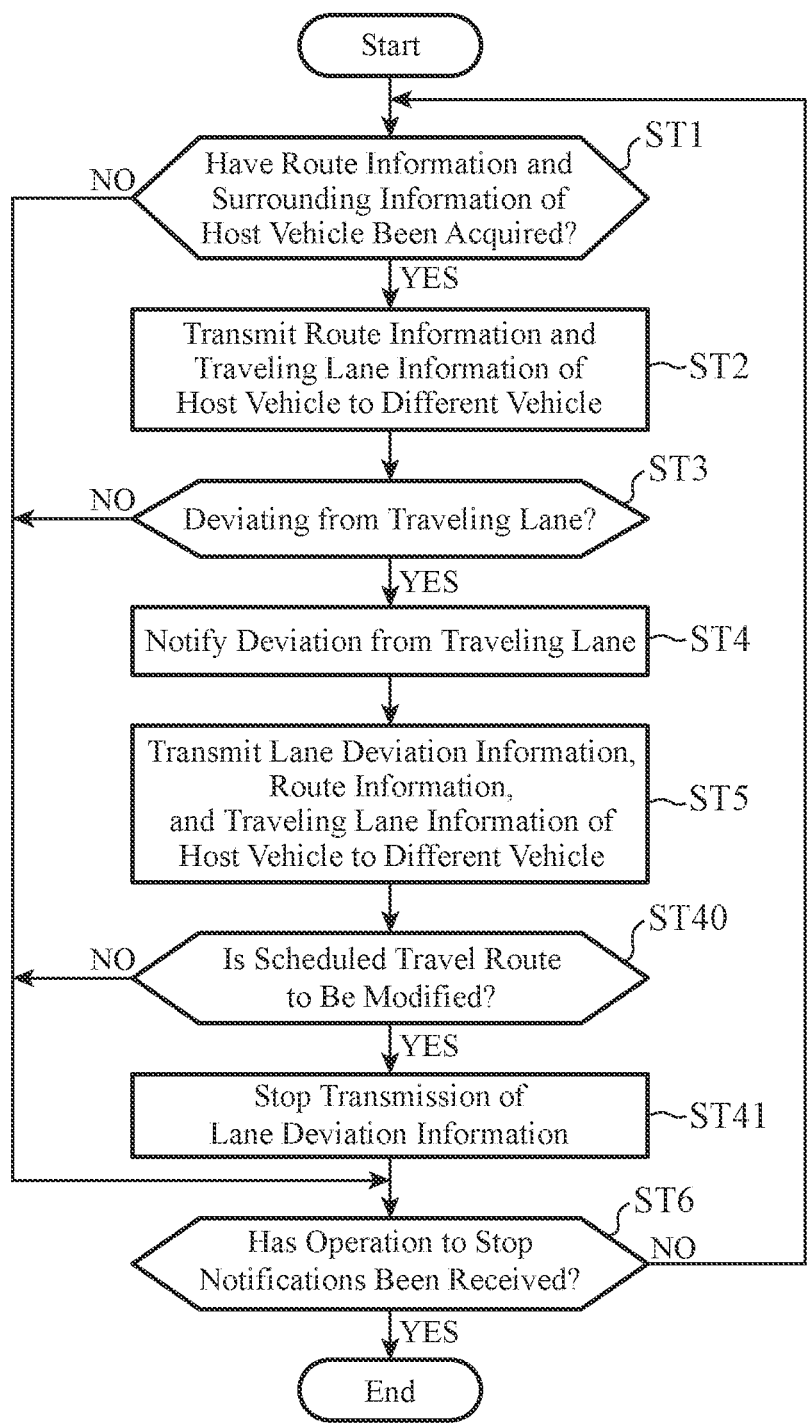
FIG. 12 is a flowchart illustrating exemplary operation of a driving assistance device according to a fourth embodiment, and is an example in which determination of lane deviation of a host vehicle is included.

FIG. 12 is a flowchart illustrating exemplary operation of the driving assistance device 1 according to the fourth embodiment. In the flowchart illustrated in FIG. 12, steps ST40 and ST41 are newly added between steps ST5 and ST6 of the flowchart illustrated in FIG. 2. Therefore, the operation will be described below focusing on steps ST40 and ST41.

In step ST40, the control unit 3 of the driving assistance device 1 mounted on the host vehicle determines whether to modify a scheduled travel route of the host vehicle. The method of determining whether to modify the scheduled travel route is not limited, the method being used by the control unit 3. For example, when operation by the driver of the host vehicle to modify the scheduled travel route is received through the input unit 8, the control unit 3 determines to modify the scheduled travel route. On the other hand, the control unit 3 determines not to modify the scheduled travel route when operation by the driver of the host vehicle to travel following the scheduled travel route is received through the input unit 8 or when there is no operation within a predetermined period of time.

If it is determined that the scheduled travel route of the host vehicle is to be modified (step ST40 "YES"), the control unit 3 performs step ST41, and if it is determined that no modification is made (step ST40 "NO"), the control unit 3 performs step ST6.

In step ST41, the control unit 3 of the driving assistance device 1 mounted on the host vehicle instructs the wireless communication unit 5 to stop transmission of the lane deviation information of the host vehicle, transmission of which to the different vehicle has started in step ST5.

Next, exemplary operation in steps ST40 and ST41 in the situation illustrated in FIG. 4 will be described.

In step ST40, if the control unit 3 of the driving assistance device 1 mounted on the first vehicle 101 determines that the first vehicle 101 continues traveling on the right turn lane 100c by modifying the scheduled travel route 101a (step ST40 "YES"), the control unit 3 performs step ST41. On the other hand, if the control unit 3 determines that the first vehicle 101 travels without modifying the scheduled travel route 101a, that is, if the first vehicle 101 changes lanes to the straight lane 100b (step ST40 "NO"), the control unit 3 performs step ST6.

As described above, the control unit 3 of the fourth embodiment determines whether the host vehicle continues traveling on the lane deviating from the scheduled travel route when lane deviation of the host vehicle is determined. The wireless communication unit 5 stops the transmission of the lane deviation information to the different vehicle when the control unit 3 determines that the host vehicle continues traveling on the lane deviating from the scheduled travel route. As a result, it is possible to stop unnecessary transmission of lane deviation information depending on whether the scheduled travel route of the host vehicle is to be modified. There are cases where the different vehicle that has received lane deviation information of the host vehicle notifies a driver of the different vehicle of the lane deviation of the host vehicle at least once in the first to third embodiments. By stopping the transmission of the lane deviation information from the host vehicle, it is possible to stop unnecessary notifications to the driver of the different vehicle thereafter.

Fifth Embodiment

The configuration of a driving assistance device 1 according to a fifth embodiment is the same as that illustrated in FIG. 1 or 9 of the first embodiment in the drawings, and thus FIGS. 1 and 9 are referred to hereinbelow. In the fifth embodiment, the driving assistance device 1 mounted on a host vehicle transmits cancellation information for lane deviation information when a driver of the host vehicle continues traveling on the current lane without following a scheduled travel route after transmitting the lane deviation information to the driving assistance device 1 mounted on a different vehicle.

Figure 13:
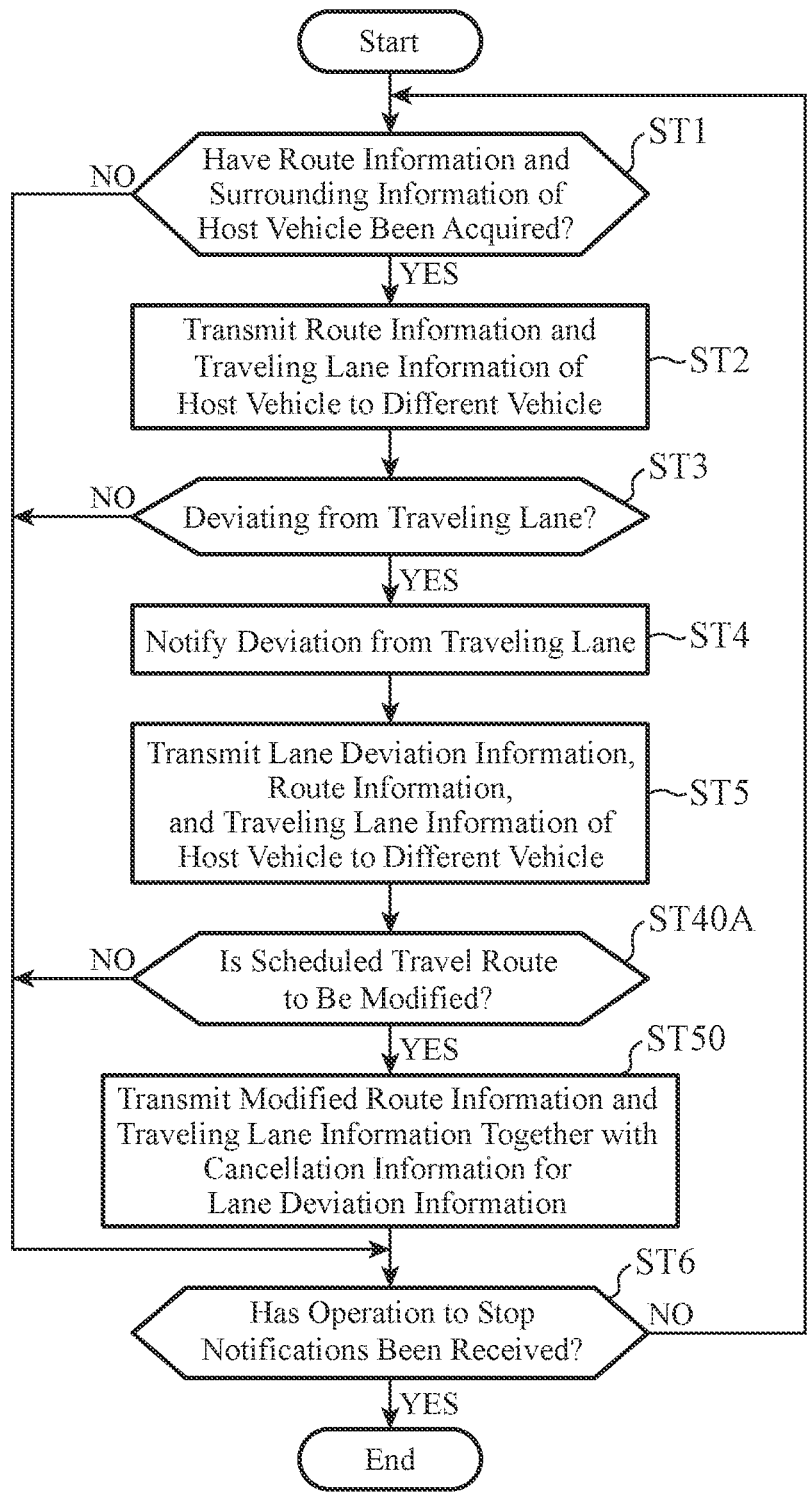
FIG. 13 is a flowchart illustrating exemplary operation of a driving assistance device according to a fifth embodiment, and is an example in which determination of lane deviation of a host vehicle is included.

FIG. 13 is a flowchart illustrating exemplary operation of the driving assistance device 1 according to the fifth embodiment. The flowchart illustrated in FIG. 13 is a partially-modified version of the flowchart illustrated in FIG. 12 of the fourth embodiment.

In step ST40A, if the control unit 3 of the driving assistance device 1 mounted on the host vehicle determines to modify a scheduled travel route of the host vehicle (step ST40A "YES"), the control unit 3 causes step ST50 to be performed, and if it is determined that no modification is made (step ST40A "NO"), the control unit 3 performs step ST6.

In step ST50, the information acquiring unit 2 of the driving assistance device 1 mounted on the host vehicle acquires route information indicating the modified scheduled travel route of the host vehicle and traveling lane information indicating the lane on which the host vehicle is currently traveling. The control unit 3 instructs the wireless communication unit 5 to transmit the modified route information and the traveling lane information of the host vehicle acquired by the information acquiring unit 2 to the different vehicle together with cancellation information for canceling the lane deviation information of the host vehicle, transmission of which to the different vehicle has started in step ST5.

Note that modification of the scheduled travel route is performed by the route calculation unit 7 of the navigation device 1a, for example. The route calculation unit 7 calculates a route from the current location to a destination on a map again on the basis of the current traveling lane information and the map data of the map data accumulating unit 6.

Figure 14:
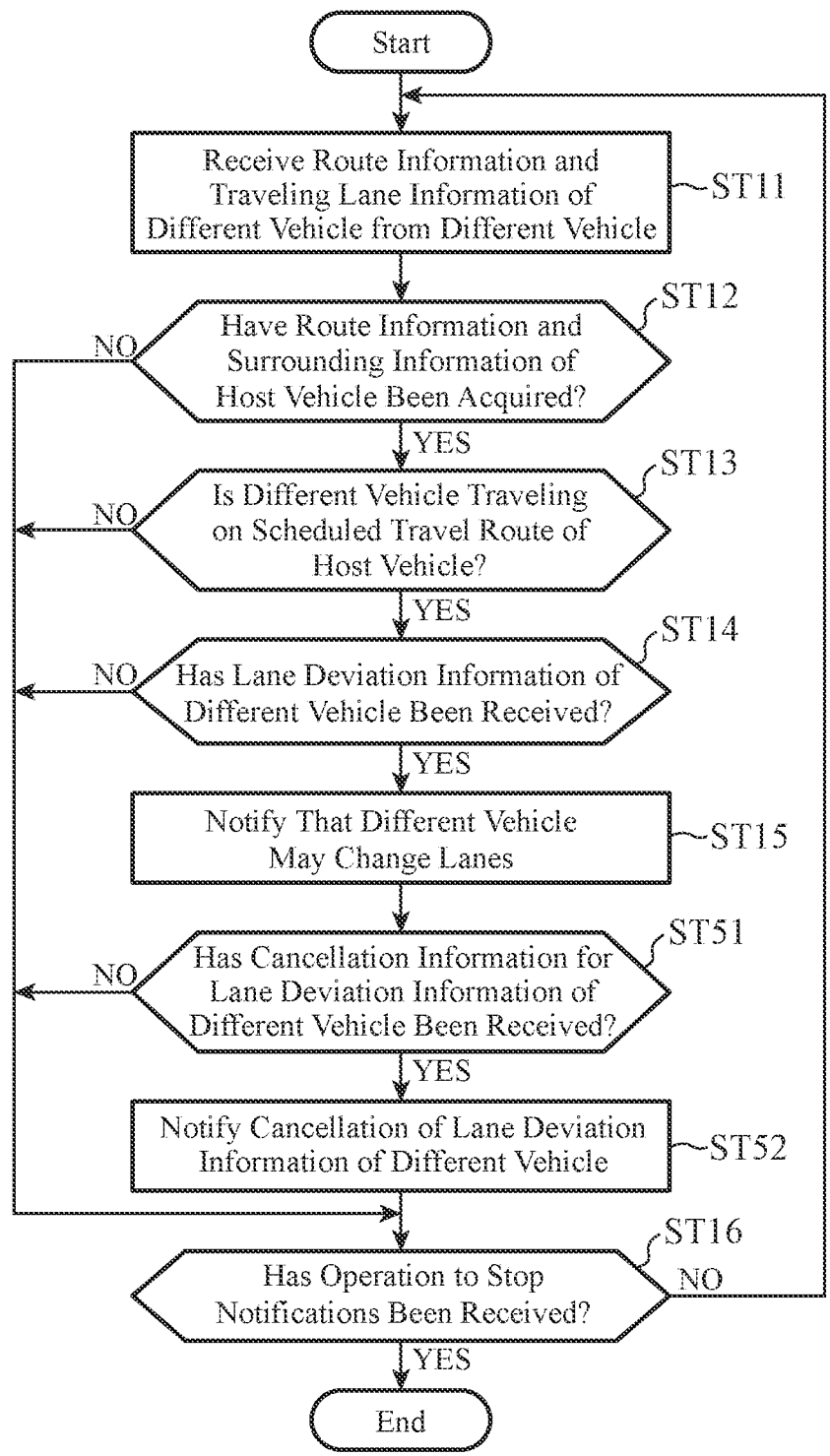
FIG. 14 is a flowchart illustrating exemplary operation of the driving assistance device according to the fifth embodiment, and is an example in which use of lane deviation information of a different vehicle is included.

FIG. 14 is a flowchart illustrating exemplary operation of the driving assistance device 1 according to the fifth embodiment. In the flowchart illustrated in FIG. 14, steps ST51 and ST52 are newly added between steps ST15 and ST16 of the flowchart illustrated in FIG. 3. Therefore, the operation will be described below focusing on steps ST51 and ST52.

In step ST51, the control unit 3 of the driving assistance device 1 mounted on the host vehicle determines whether the wireless communication unit 5 has received the cancellation information for the lane deviation information from the different vehicle. If it is determined that the cancellation information has been received (step ST51 "YES"), the control unit 3 performs step ST52, and if it is determined that the cancellation information has not been received (step ST51 "NO"), the control unit 3 performs step ST16.

In step ST52, the control unit 3 of the driving assistance device 1 mounted on the host vehicle instructs the notification unit 4 to notify the driver of the host vehicle that the lane deviation information of the different vehicle has been canceled.

Figure 15:
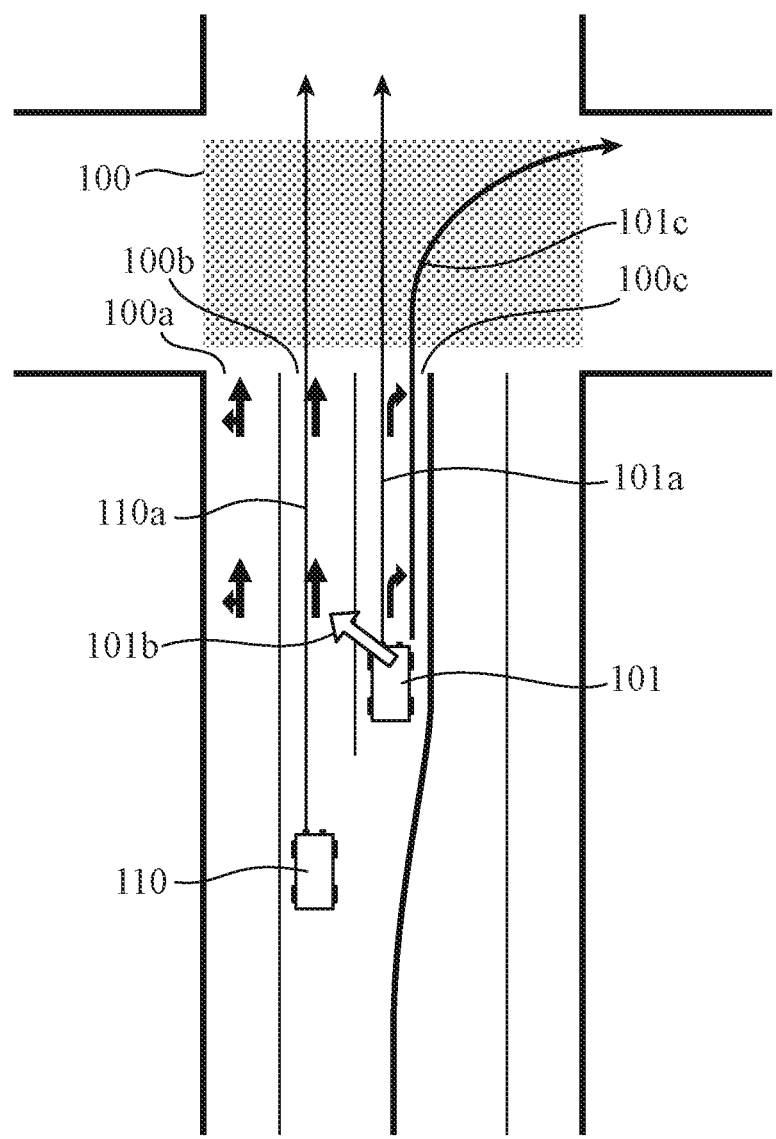
FIG. 15 is a diagram illustrating a situation in which a first vehicle scheduled to travel straight has modified a scheduled travel route to a right turn in the fifth embodiment.

FIG. 15 is a diagram illustrating a situation in which the first vehicle 101 scheduled to travel straight has modified a scheduled travel route to a right turn in the fifth embodiment. In FIG. 15, parts which are the same as or corresponding to those in FIG. 4 are denoted by the same symbols and descriptions thereof are omitted. The first vehicle 101 travels not on the original scheduled travel route 101a but on a new modified scheduled travel route 101c.

Next, exemplary operation in steps ST50 to ST52 in the situation illustrated in FIG. 15 will be described.

In step ST50, the control unit 3 of the driving assistance device 1 mounted on the first vehicle 101 instructs the wireless communication unit 5 to transmit route information indicating the modified scheduled travel route 101c, traveling lane information indicating the right turn lane 100c on which the first vehicle 101 is currently traveling, and cancellation information for the lane deviation information to the driving assistance device 1 mounted on the second vehicle 110.

In step ST51, the wireless communication unit 5 of the driving assistance device 1 mounted on the second vehicle 110 receives the modified route information of the first vehicle 101, the traveling lane information, and the cancellation information for the lane deviation information from the driving assistance device 1 mounted on the first vehicle 101.

In step ST52, the notification unit 4 of the driving assistance device 1 mounted on the second vehicle 110 notifies a driver of the second vehicle 110 that the lane deviation information of the first vehicle 101 has been cancelled and that the possibility for the first vehicle 101 to change lanes has been eliminated.

Note that, in the fifth embodiment the example has been described in which the operation of receiving the cancellation information is added to the flowchart illustrated in FIG. 3 of the first embodiment; however, the operation of receiving the cancellation information may be added to the flowchart illustrated in FIG. 10 of the second embodiment or FIG. 11 of the third embodiment.

Figure 16:
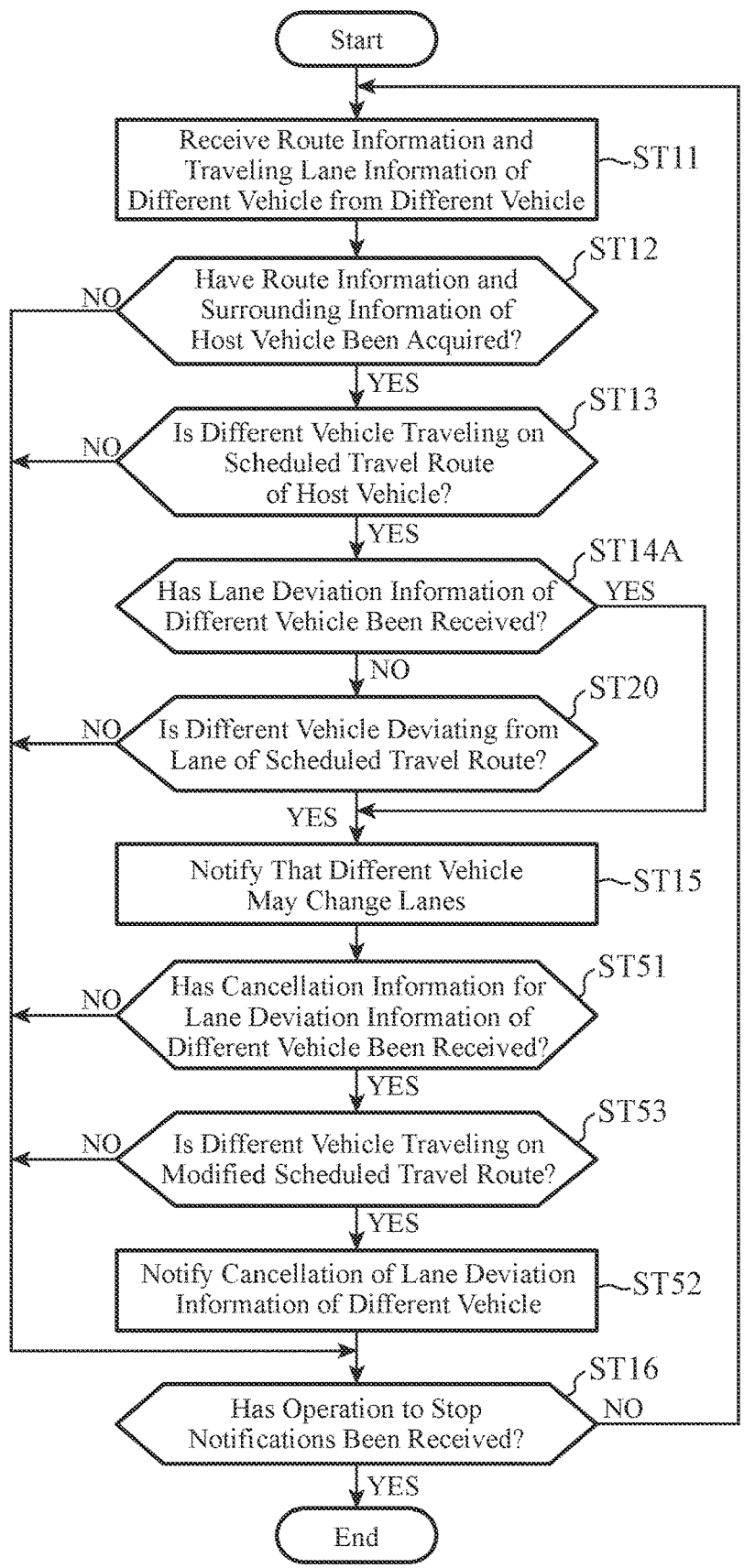
FIG. 16 is a flowchart illustrating a modification of the operation of the driving assistance device according to the fifth embodiment, and is an example in which use of lane deviation information of a different vehicle is included.
Figure 17:
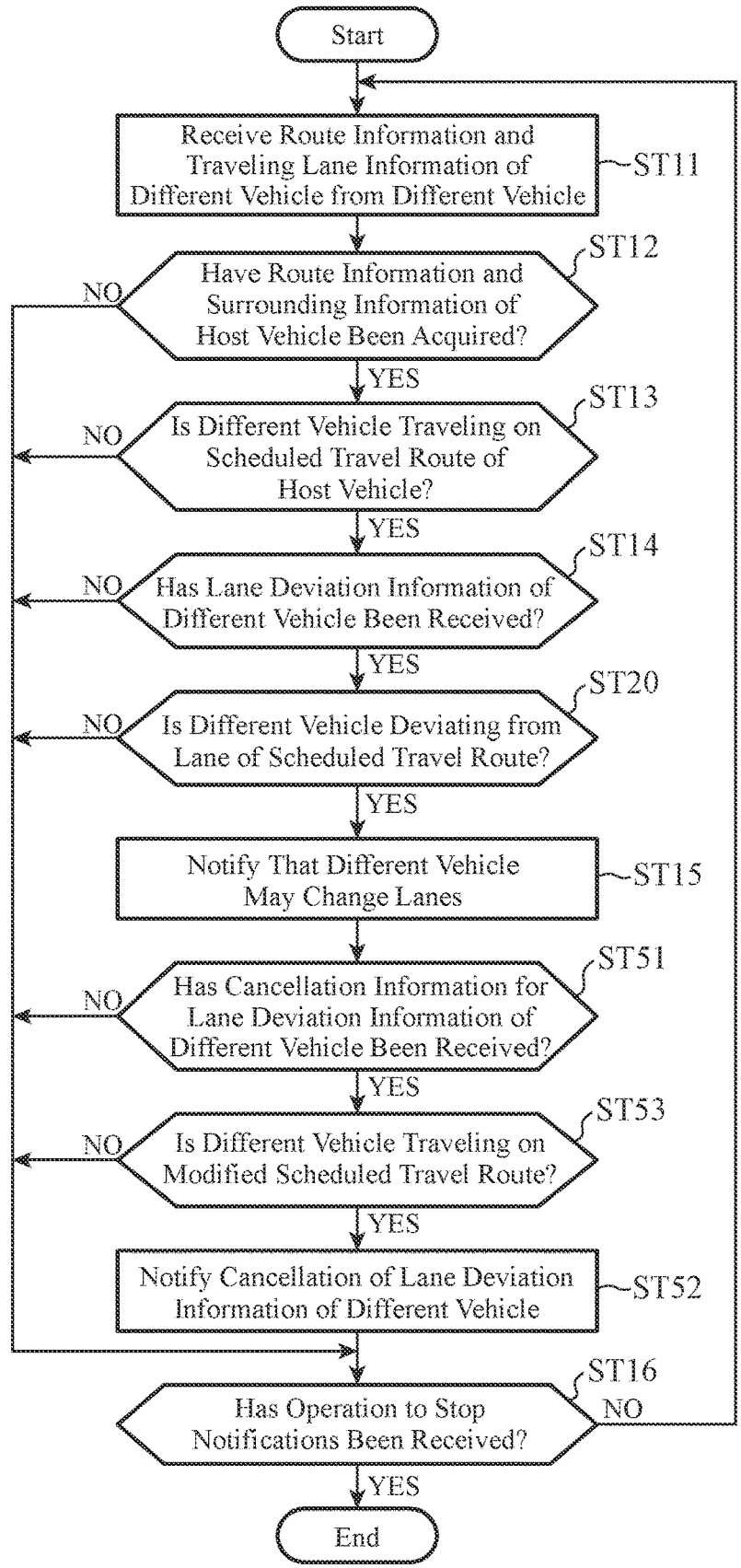
FIG. 17 is a flowchart illustrating a modification of the operation of the driving assistance device according to the fifth embodiment, and is an example in which use of lane deviation information of a different vehicle is included.

FIGS. 16 and 17 are flowcharts illustrating modifications of the operation of the driving assistance device 1 according to the fifth embodiment. In the flowchart illustrated in FIG. 16, steps ST51 to ST53 are newly added between steps ST15 and ST16 of the flowchart illustrated in FIG. 10. In the flowchart illustrated in FIG. 17, steps ST51 to ST53 are newly added between steps ST15 and ST16 of the flowchart illustrated in FIG. 11.

In step ST53, the control unit 3 of the driving assistance device 1 mounted on the host vehicle identifies the lane on which a different vehicle is traveling, and thereby determines whether the different vehicle is traveling on the lane of a modified scheduled travel route. The method of determination in step ST53 is the same as that in step ST20.

If the control unit 3 of the driving assistance device 1 mounted on the host vehicle determines that the different vehicle is traveling on the lane of the modified scheduled travel route (step ST53 "YES"), the control unit 3 performs step ST52, and if it is determined that the different vehicle is not traveling on the lane of the modified scheduled travel route (step ST53 "NO"), the control unit 3 performs step ST16.

As described above, the control unit 3 of the fifth embodiment determines whether the host vehicle continues traveling on the lane deviating from the scheduled travel route when lane deviation of the host vehicle is determined. When the control unit 3 determines that the host vehicle continues traveling on the lane deviating from the scheduled travel route, the wireless communication unit 5 transmits, to a different vehicle, cancellation information for canceling the lane deviation information and route information indicating a new scheduled travel route of the host vehicle. As a result, the different vehicle can notify the driver of the different vehicle of the cancellation of the lane deviation information of the host vehicle, thereby preventing unnecessary notification to the driver of the different vehicle to prevent unnecessary call for attention. In addition, the reason for canceling the notification becomes clear to the driver of the different vehicle. Furthermore, the different vehicle can improve the accuracy of extracting a vehicle whose lane deviation information has been canceled by re-comparing the new route information of the host vehicle with the lane on which the host vehicle is actually traveling in the flowcharts of FIGS. 16 and 17.

Figure 18:
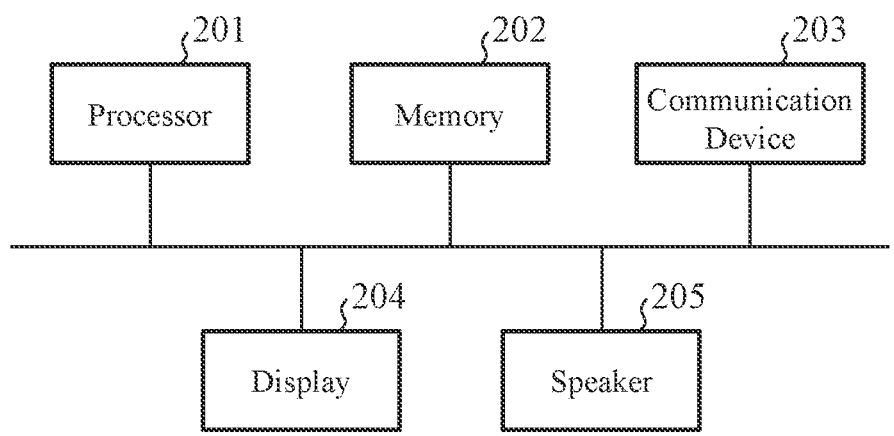
FIG. 18 is a diagram illustrating a hardware configuration example of the driving assistance device according to each of the embodiments.

Lastly, a hardware configuration example of the driving assistance device 1 according to each of the embodiments will be described. FIG. 18 is a diagram illustrating a hardware configuration example of the driving assistance device 1 according to each of the embodiments.

The information acquiring unit 2 and the wireless communication unit 5 in the driving assistance device 1 correspond to a communication device 203. The communication device 203 communicates with a navigation device or the like. The communication device 203 performs inter-vehicle communication and the like. The notification unit 4 in the driving assistance device 1 corresponds to at least one of a display 204 and a speaker 205.

The control unit 3 in the driving assistance device 1 corresponds to a processor 201 that executes a program stored in a memory 202. The function of the control unit 3 is implemented by software, firmware, or a combination of software and firmware. The software or the firmware is described as a program, and is stored in the memory 202. The processor 201 reads and executes the program stored in the memory 202 and thereby implements the function of the control unit 3. In other words, the driving assistance device 1 includes the memory 202 for storing the program, execution of which by the processor 201 results in execution of the steps illustrated in the flowcharts of FIGS. 2 and 3. Moreover, it can also be said that this program causes a computer to execute the procedure or the method which the control unit 3 uses.

The processor 201 may be a central processing unit (CPU), a processing device, a computing device, a microprocessor, a microcomputer, or the like.

The memory 202 may be a nonvolatile or volatile semiconductor memory such as a RAM, a ROM, an erasable programmable ROM (EPROM), or a flash memory, a magnetic disk such as a hard disk or a flexible disk, or an optical disk such as a compact disc (CD) or a DVD.

Note that the present invention may include a flexible combination of the embodiments, a modification of any component of the embodiments, or omission of any component in the embodiments within the scope of the present invention.

INDUSTRIAL APPLICABILITY

A driving assistance device according to the present invention transmits lane deviation of a host vehicle to a different vehicle, and thus is suitable for use in a driving assistance device for avoiding hazards such as collision between a host vehicle and a different vehicle.

REFERENCE SIGNS LIST

1: Driving assistance device, 1a: Navigation device, 2: Information acquiring unit, 3: Control unit, 4: Notification unit, 4a: Display unit, 4b: Image control unit, 4c: Voice output unit, 4d: Voice control unit, 5: Wireless communication unit, 5a: Reception antenna, 5b: Reception unit, 5c: Transmission antenna, 5d: Transmission unit, 6: Map data accumulating unit, 7: Route calculation unit, 8: Input unit, 21: Current location detection unit, 21a: GNSS reception unit, 21b: Azimuth detection unit, 21c: Pulse detection unit, 23: Route guidance unit, 27: Surrounding information detection unit, 28: External sensor, 28a: Camera, 28b: Image processing unit, 28c: Radar, 28d: Radar control unit, 100: Intersection, 100a: Left turn and straight lane, 100b: Straight lane, 100c: Right turn lane, 100d: Left turn lane, 100e: Right turn and straight lane, 101: First vehicle, 101a, 101c: Scheduled travel route, 101b: Correct traveling lane direction, 110: Second vehicle, 110a: Scheduled travel route, 201: Processor, 202: Memory, 203: Communication device, 204: Display, 205: Speaker

The invention claimed is:
1. A driving assistance device comprising:
a communication device to acquire route information indicating a scheduled travel route of a host vehicle and surrounding information indicating a surrounding situation of the host vehicle detected by a sensor mounted on the host vehicle;
a processor to execute a program;
a memory to store the program which, when executed by the processor, performs a process of
determining whether the host vehicle has deviated from a lane of the scheduled travel route using the route information and the surrounding information of the host vehicle acquired by the communication device; and
at least one of a display to notify a driver of the host vehicle when lane deviation of the host vehicle is determined and a speaker to notify the driver of the host vehicle when lane deviation of the host vehicle is determined, wherein the communication device transmits, to a different vehicle, the route information of the host vehicle, traveling lane information indicating a lane on which the host vehicle is traveling, and lane deviation information indicating lane deviation of the host vehicle.

2. The driving assistance device according to claim 1, wherein the communication device receives lane deviation information indicating that a different vehicle has deviated from a lane of a scheduled travel route, the lane deviation information transmitted from the different vehicle, and the at least one of the display and the speaker notifies the driver of the host vehicle of lane deviation of the different vehicle when the lane deviation information of the different vehicle is received by the communication device.

3. The driving assistance device according to claim 1, wherein the communication device receives route information indicating a scheduled travel route of a different vehicle, the route information transmitted from the different vehicle, the program performs a process of determining whether the different vehicle has deviated from a lane of the scheduled travel route using the route information of the different vehicle received by the communication device and the surrounding information of the host vehicle acquired by the communication device, and the at least one of the display and the speaker notifies the driver of the host vehicle when lane deviation of the different vehicle is determined.

4. The driving assistance device according to claim 1, wherein the communication device receives route information indicating a scheduled travel route of a different vehicle and lane deviation information indicating that the different vehicle has deviated from a lane of the scheduled travel route, the route information and the lane deviation information transmitted from the different vehicle, the program performs a process of determining whether the different vehicle has deviated from the lane of the scheduled travel route using the route information of the different vehicle received by the communication device and the surrounding information of the host vehicle acquired by the communication device, and the at least one of the display and the speaker notifies the driver of the host vehicle when the lane deviation information of the different vehicle is received by the communication device and when lane deviation of the different vehicle is determined.

5. The driving assistance device according to claim 1, wherein the program performs a process of determining whether the host vehicle continues traveling on a lane deviating from the scheduled travel route when lane deviation of the host vehicle is determined, and the communication device stops transmission of the lane deviation information to the different vehicle when it is determined that the host vehicle continues traveling on the lane deviating from the scheduled travel route.

6. The driving assistance device according to claim 1, wherein the program performs a process of determining whether the host vehicle continues traveling on a lane deviating from the scheduled travel route when lane deviation of the host vehicle is determined, and when it is determined that the host vehicle continues traveling on the lane deviating from the scheduled travel route, the communication device transmits, to the different vehicle, cancellation information for cancelling the lane deviation information and route information indicating a new scheduled travel route of the host vehicle.

7. A driving assistance method comprising:

acquiring route information indicating a scheduled travel route of a host vehicle and surrounding information indicating a surrounding situation of the host vehicle detected by a sensor mounted on the host vehicle;

determining whether the host vehicle has deviated from a lane of the scheduled travel route using the route information and the surrounding information of the host vehicle acquired;

notify a driver of the host vehicle when lane deviation of the host vehicle is determined; and transmitting, to a different vehicle, the route information of the host vehicle, traveling lane information indicating a lane on which the host vehicle is traveling, and lane deviation information indicating lane deviation of the host vehicle.

* * * * *